US012614882B1

(12) United States Patent
Baldwin

(10) Patent No.: US 12,614,882 B1
(45) Date of Patent: Apr. 28, 2026

(54) POWERED WALL PLATE

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

(21) Appl. No.: 19/173,202

(22) Filed: Apr. 8, 2025

Related U.S. Application Data

(60) Continuation of application No. 18/362,651, filed on Jul. 31, 2023, now Pat. No. 12,308,581, which is a continuation of application No. 17/992,666, filed on Nov. 22, 2022, now Pat. No. 11,715,918, which is a continuation of application No. 17/168,949, filed on Feb. 5, 2021, now Pat. No. 11,509,102, which is a continuation-in-part of application No. 16/854,836, filed on Apr. 21, 2020, now abandoned, which is a continuation of application No. 16/655,204, filed on Oct. 16, 2019, now Pat. No. 10,630,031, which is a (Continued)

(51) Int. Cl.
*H01R 13/74* (2006.01)
*H01R 13/717* (2006.01)
*H01R 27/02* (2006.01)

(52) U.S. Cl.
CPC ......... *H01R 13/748* (2013.01); *H01R 13/717* (2013.01); *H01R 27/02* (2013.01)

(58) Field of Classification Search
CPC ..... H01R 13/748; H01R 13/717; H01R 27/02
See application file for complete search history.

(56) References Cited

U.S. PATENT DOCUMENTS 3,522,595 A * 8/1970 White .................... G08B 17/06 337/380
4,514,789 A 4/1985 Jester
4,536,694 A 8/1985 McCarty (Continued)

FOREIGN PATENT DOCUMENTS

DE 102016006308 A1 10/2017
EP 3104350 A1 12/2016

(Continued)

OTHER PUBLICATIONS

AES System Cameras Date First Available Jul. 25, 2016 (Year: 2016) 7 pages.

(Continued)

*Primary Examiner* — Thanh Tam T Le
(74) *Attorney, Agent, or Firm* — Kenneth C. Booth; Booth Udall, PLC

(57) ABSTRACT

A powered wall plate comprising a wall plate, at least two electrical connectors, an electrical circuit, and an electrical feature. The wall plate has a front surface opposite a rear surface and at least one opening sized to expose a first electrical receptacle of an electrical device. The at least two electrical connectors originate within the wall plate and extend rearward from the rear surface. The electrical circuit is located between the front surface and the rear surface. The electrical feature is exposed on the wall plate and is configured to receive power from the at least two electrical connectors through the electrical circuit.

20 Claims, 40 Drawing Sheets

Related U.S. Application Data division of application No. 15/972,001, filed on May 4, 2018, now Pat. No. 10,574,005.

(60) Provisional application No. 63/023,362, filed on May 12, 2020, provisional application No. 62/502,763, filed on May 7, 2017.

(56) References Cited

U.S. PATENT DOCUMENTS 4,617,613 A 10/1986 Rice
4,835,343 A 5/1989 Graef
4,897,049 A 1/1990 Miller
5,004,435 A 4/1991 Jammet
5,094,630 A 3/1992 Jammet
5,180,886 A 1/1993 Dierenbach
5,384,428 A 1/1995 Luu
5,401,184 A 3/1995 Sundstrom
5,539,821 A 7/1996 Blonder
5,683,166 A * 11/1997 Lutzker .................. H05B 33/06 250/466.1
5,700,158 A 12/1997 Neiser
5,708,705 A 1/1998 Yamashita
5,769,653 A 6/1998 Osterbrock
5,932,845 A 8/1999 Lacy
6,026,605 A 2/2000 Tippett
6,051,788 A 4/2000 Nichols
6,056,450 A 5/2000 Walling
6,160,219 A 12/2000 Maltby
6,297,450 B1 10/2001 Yu
6,362,987 B1 * 3/2002 Yurek .................... H01R 29/00 363/146
6,423,900 B1 7/2002 Soules
6,511,343 B1 1/2003 Shotey
6,514,093 B1 2/2003 Yu
6,520,792 B2 2/2003 Chen-Chiang
6,674,003 B1 1/2004 Torres
6,697,117 B1 2/2004 Park
6,752,541 B1 6/2004 Dykyj
6,864,798 B2 3/2005 Janik
6,897,381 B2 5/2005 He
6,923,663 B2 8/2005 Oddsen
6,923,675 B2 * 8/2005 Gorin ..................... H01R 24/62 439/536
6,977,341 B1 12/2005 Gustaveson, II
6,981,896 B2 1/2006 Su
6,993,289 B2 1/2006 Janik
6,993,417 B2 1/2006 Osann, Jr.
7,036,948 B1 5/2006 Wyatt
7,140,922 B2 * 11/2006 Luu ...................... H01R 31/065 439/651
7,167,078 B2 1/2007 Pourchot
7,247,793 B2 7/2007 Hinkson
7,271,339 B2 9/2007 Dinh
7,273,983 B1 * 9/2007 Rintz ...................... F21S 8/035 174/67
7,394,019 B2 7/2008 Gesue
7,582,830 B2 9/2009 Claffy
7,654,855 B2 2/2010 Liao
7,833,037 B2 11/2010 Reusche
7,887,341 B2 2/2011 Liao
7,896,702 B2 3/2011 Stiehl
7,902,458 B2 3/2011 Eshelman
7,930,118 B2 4/2011 Vinden
7,931,008 B2 4/2011 Verner
7,981,896 B2 7/2011 Bennani
7,983,064 B2 7/2011 Zhang
8,011,937 B2 9/2011 Oddsen
8,308,493 B2 11/2012 Lim
8,342,861 B2 1/2013 Stiehl
8,378,625 B2 2/2013 Gourley
8,456,131 B2 6/2013 Bukow
8,668,347 B2 * 3/2014 Ebeling .................... H05K 5/03 174/67
8,668,647 B2 3/2014 Eskandari
8,696,368 B2 4/2014 Quezada
8,712,486 B2 4/2014 Sorias
8,834,210 B2 9/2014 Brausen
8,864,517 B2 10/2014 Cohen
8,912,442 B2 * 12/2014 Smith ...................... H05K 5/03
8,951,053 B2 2/2015 Ho
9,035,180 B2 5/2015 Smith
9,035,181 B2 5/2015 Smith
9,065,263 B2 6/2015 Porcano
9,071,740 B1 6/2015 Duffy
9,083,180 B2 7/2015 Dodal
9,113,051 B1 8/2015 Scalisi
9,124,105 B2 9/2015 Gunderman
9,329,607 B2 5/2016 Kevelos
9,362,728 B2 6/2016 Smith
9,398,667 B2 7/2016 Kevelos
9,461,419 B2 10/2016 Hector, Jr.
9,464,795 B2 10/2016 Ebeling
9,482,426 B2 11/2016 Diotte
9,525,232 B1 12/2016 Insalaco
9,551,454 B2 1/2017 Lipke
D781,241 S 3/2017 Knight
9,732,921 B2 8/2017 Chien
9,742,111 B2 8/2017 Smith
9,768,562 B2 * 9/2017 Smith ................ H01R 13/6675
9,769,420 B1 9/2017 Moses
9,825,414 B2 11/2017 Armstrong
9,882,313 B2 1/2018 Steinbuchel, IV
9,882,318 B2 1/2018 Smith
9,882,361 B2 1/2018 Smith
9,917,430 B2 * 3/2018 Smith .................. H01R 25/006
9,941,642 B1 4/2018 Waggoner
9,997,860 B1 6/2018 Hernandez, Jr.
10,063,316 B2 8/2018 Mccolloch
10,074,948 B2 9/2018 Goyal
10,136,534 B2 11/2018 Ebeling
10,161,806 B2 * 12/2018 Lermann .................. G01K 1/12
10,276,979 B2 4/2019 Cyzen
10,305,216 B1 5/2019 Shotey
10,340,722 B2 7/2019 Rohmer
10,381,788 B2 8/2019 Smith
10,381,789 B2 8/2019 Smith
10,446,970 B2 10/2019 Shotey
10,505,326 B2 12/2019 Chien
10,587,067 B2 3/2020 Lager
10,642,231 B1 5/2020 Billings
10,644,465 B2 5/2020 O'Reilly
10,665,996 B2 * 5/2020 O'Reilly ............... H02J 7/0042
10,687,432 B2 6/2020 Ebeling
10,720,727 B1 7/2020 Shotey
10,729,223 B2 8/2020 Weaver
10,764,561 B1 9/2020 Devitt
10,796,798 B1 10/2020 Stone
10,903,636 B1 1/2021 Baldwin
10,985,516 B1 4/2021 Gartside
11,011,867 B1 5/2021 Shotey
11,063,396 B2 * 7/2021 Iaconis .................. H04N 7/183
11,189,975 B1 11/2021 Baldwin
11,277,587 B1 3/2022 Baldwin
11,394,157 B2 7/2022 Smith
11,404,831 B1 8/2022 Baldwin
11,489,280 B1 11/2022 Baldwin
11,489,323 B1 11/2022 Baldwin
11,509,102 B1 11/2022 Baldwin
11,632,844 B2 4/2023 Ebeling
11,778,302 B1 10/2023 Baldwin
11,916,691 B2 2/2024 Scalisi
2001/0017339 A1 8/2001 Brotz
2003/0108099 A1 6/2003 Nagumo
2003/0201371 A1 10/2003 Zadok
2004/0121648 A1 * 6/2004 Voros ................. H01R 13/6215 439/535
2004/0142601 A1 7/2004 Luu
2004/0189130 A1 9/2004 Hovanky
2005/0025360 A1 2/2005 Gin
2008/0024605 A1 1/2008 Osann, Jr.
2008/0088703 A1 4/2008 Dollahite
2008/0136915 A1 6/2008 Iwamura
2008/0157715 A1 7/2008 Rosenboom

(56) References Cited

U.S. PATENT DOCUMENTS

| | | | |
|---|---|---|---|
| 2008/0272258 | A1 | 11/2008 | Wysoczynski |
| 2009/0141477 | A1 | 6/2009 | Bhosale |
| 2010/0118162 | A1 | 5/2010 | Saijo |
| 2012/0007555 | A1 | 1/2012 | Bukow |
| 2012/0025972 | A1 | 2/2012 | Boyden |
| 2012/0068612 | A1 | 3/2012 | Ebeling |
| 2013/0050657 | A1 | 2/2013 | Morohoshi |
| 2013/0100279 | A1 | 4/2013 | Nordenfelt |
| 2014/0132475 | A1 | 5/2014 | Bhutani |
| 2014/0162777 | A1 | 6/2014 | Hsu |
| 2014/0274143 | A1 | 9/2014 | Trantow |
| 2014/0320663 | A1 | 10/2014 | Chien |
| 2014/0354219 | A1 | 12/2014 | Fan |
| 2014/0362559 | A1 | 12/2014 | Chien |
| 2014/0375532 | A1 | 12/2014 | Chien |
| 2015/0189226 | A1 | 7/2015 | Gravina |
| 2015/0340826 | A1 | 11/2015 | Chien |
| 2015/0357762 | A1 | 12/2015 | Green |
| 2016/0232763 | A1 | 8/2016 | Sockol |
| 2016/0277679 | A1 | 9/2016 | Kimura |
| 2016/0285220 | A1 | 9/2016 | Haw |
| 2017/0041530 | A1 | 2/2017 | Kimura |
| 2017/0223109 | A1 | 8/2017 | Shoemake |
| 2018/0013271 | A1 | 1/2018 | Goulden |
| 2018/0188779 | A1 | 7/2018 | Allen |
| 2018/0193545 | A1 | 7/2018 | Crnkovich |
| 2018/0241146 | A1 | 8/2018 | Smith |
| 2018/0253162 | A1 | 9/2018 | Wroblewski |
| 2018/0301882 | A1 | 10/2018 | Smith |
| 2019/0020183 | A1 | 1/2019 | Hitchman |
| 2019/0212230 | A1 | 7/2019 | Novosselov |
| 2019/0219899 | A1 | 7/2019 | Vega |
| 2019/0229478 | A1 | 7/2019 | Iaconis |
| 2020/0120328 | A1 | 4/2020 | Hamilton |
| 2020/0196141 | A1 | 6/2020 | Baker |
| 2020/0216025 | A1 | 7/2020 | Le Bourgeois |
| 2020/0412070 | A1 | 12/2020 | Owen |
| 2021/0098949 | A1 | 4/2021 | Diotte |

FOREIGN PATENT DOCUMENTS

| | | | |
|---|---|---|---|
| JP | 2019056906 | A | 4/2019 |
| KR | 20100012881 | | 2/2010 |

OTHER PUBLICATIONS

Combination Wireless Wall Mount Charger & USB Outlet, https://www.hubbell.com/wiringdevice-kellems/en/Products/Electrical-Electronic/Wiring-Devices/Charging-Solutions/Power-Charging-Stations/USB2028AC/p/3936295#prod-resources-section. Printed on Jan. 28, 2020, 2 pages.

* cited by examiner

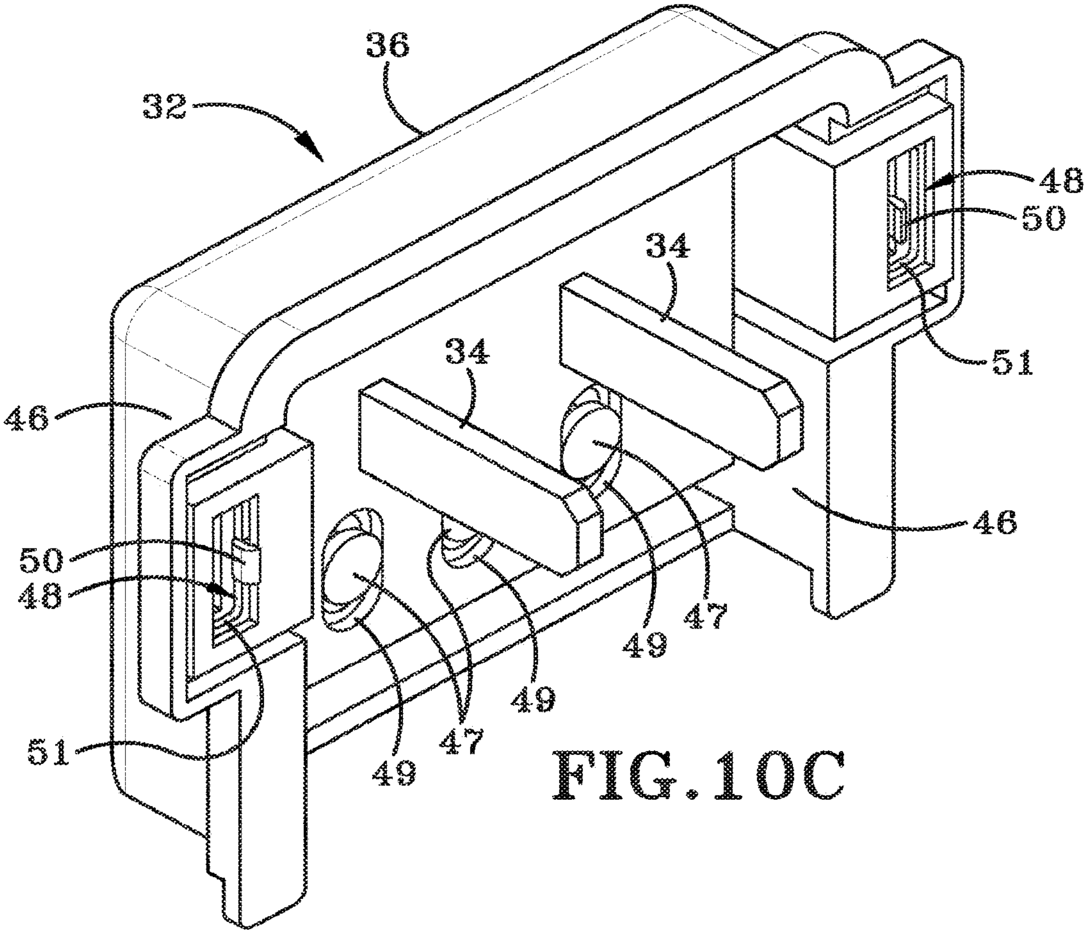
FIG. 10C
FIG. 10D
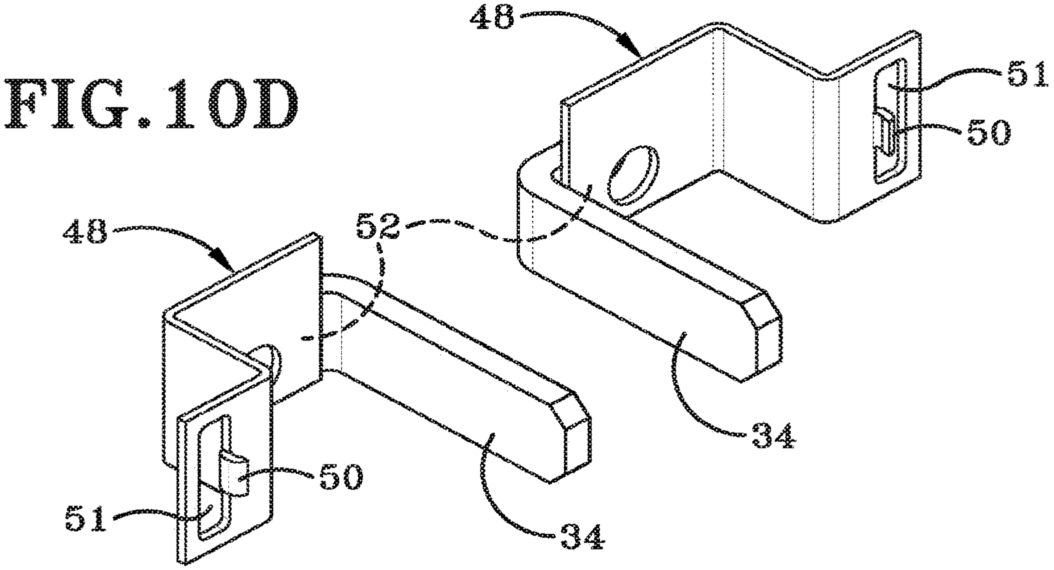

POWERED WALL PLATE

RELATED APPLICATIONS

This application is a continuation of U.S. Utility patent application Ser. No. 18/362,651, entitled "POWERED WALL PLATE WITH PLUG PRONGS" to Jeffrey P. Baldwin, filed Jul. 31, 2023, which is a continuation of U.S. Utility patent application Ser. No. 17/992,666 entitled "Powered Wall Plate With Plug Prongs" to Jeffrey P. Baldwin, filed Nov. 22, 2022, and issued as Utility U.S. Pat. No. 11,715,918 on Aug. 1, 2023, which is a continuation of U.S. Utility patent application Ser. No. 17/168,949 entitled "Powered Wall Plate With Plug Prongs" to Jeffrey P. Baldwin, filed Feb. 5, 2021, and issued as Utility U.S. Pat. No. 11,509,102 on Nov. 22, 2022, which application is a continuation-in-part of U.S. Utility patent application Ser. No. 16/854,836 entitled "Powered Wall Plate" to Jeffrey P. Baldwin, filed on Apr. 21, 2020, now abandoned, which application is a continuation application of U.S. Utility patent application Ser. No. 16/655,204 entitled "Powered Wall Plate" to Jeffrey P. Baldwin, filed on Oct. 16, 2019, and issued as Utility U.S. Pat. No. 10,630,031 on Apr. 21, 2020, which application is a divisional application of U.S. Utility patent application Ser. No. 15/972,001 entitled "Powered Wall Plate" to Jeffrey P. Baldwin, filed on May 4, 2018, and issued as U.S. Pat. No. 10,574,005 on Feb. 25, 2020, which application claims the benefit of the filing date of U.S. Provisional Patent Application 62/502,763 entitled "Powered Wall Plate" to Jeffrey P. Baldwin that was filed on May 7, 2017, the contents of each of which are hereby incorporated herein by this reference.

Application Ser. No. 17/168,949 also claims the benefit of the filing date of U.S. Provisional Patent Application 63/023,362 entitled "Powered Wall Plate with Plug Prongs" to Jeffrey P. Baldwin, which was filed on May 12, 2020, the contents of which are hereby incorporated herein by this reference.

BACKGROUND

1. Technical Field

Aspects of the present disclosure relate generally to wall plates and wall plates which are electrically active and receive and/or convey electrical current.

2. Background Art

Wall plates are well known and are used to fill in the space between an electrical box and an electrical device. Specifically, the wall plates are known to provide a more aesthetically pleasing appearance while also preventing access to the electrical device. By preventing access to the electrical device, the user is safer because electrical wiring is not readily accessible.

Wall plates are also known to provide a simple lighting source or powering portable devices USB, but are commonly unsafe and rely on direct, spring biased connections with an installed electrical receptacle. These spring biased electrical connections are unsafe due to the inherent unreliability of the spring biased connections which may short or become damaged over time, leading to electrical and/or fire hazards.

SUMMARY

Aspects of this document relate to a powered wall plate, comprising a wall plate having a front surface opposite a rear surface and at least one opening extending through the front surface and the rear surface sized to expose a first electrical receptacle of an electrical device therethrough, at least two electrical plug prongs originating within the wall plate and extending rearward from the rear surface, the at least two electrical plug prongs configured to removably mate with a second electrical receptacle of the electrical device, at least one mounting screw aperture extending through the wall plate and configured to receive at least one mounting screw to attach the wall plate to the electrical device, a protruding front face extending forward of the front surface, an electrical circuit located between the protruding front face and the rear surface and electrically coupled to the at least two electrical plug prongs, at least one LED light located along a bottom edge of the wall plate and electrically coupled to the electrical circuit, and a photocell exposed on the protruding front face, electrically coupled to the electrical circuit and to the at least one LED light, and configured to measure an ambient light level.

Particular embodiments may comprise one or more of the following features. The protruding front face may be located on a bottom half of the wall plate. The wall plate may have a profile with a first thickness and a second thickness and the second thickness may be less than three times the first thickness. The rear surface may comprise a removable circuit back cover configured to cover the electrical circuit when the circuit back cover is installed on the wall plate. The powered wall plate may further comprise a control switch positioned on the protruding front face and electrically coupled to the at least one LED light, the control switch having an on position, an off position, and an auto position, wherein the control switch is configured to turn on the at least one LED light when the control switch is in the on position, turn off the at least one LED light when the control switch is in the off position, and selectively turn on the at least one LED light when the control switch is in the auto position based on the ambient light level measured by the photocell.

Aspects of this document relate to a powered wall plate, comprising a wall plate having a front surface opposite a rear surface and at least one opening extending through the front surface and the rear surface sized to expose a first electrical receptacle of an electrical device therethrough, at least two electrical plug prongs originating within the wall plate and extending rearward from the rear surface, the at least two electrical plug prongs configured to removably mate with a second electrical receptacle of the electrical device, at least one mounting screw aperture extending through the wall plate and configured to receive at least one mounting screw to attach the wall plate to the electrical device, an electrical circuit located between the front surface and the rear surface and electrically coupled to the at least two electrical plug prongs, and at least one light located along a bottom edge of the wall plate and electrically coupled to the electrical circuit.

Particular embodiments may comprise one or more of the following features. The wall plate may have a profile with a first thickness and a second thickness and the second thickness may be less than three times the first thickness. The rear surface may comprise a removable circuit back cover configured to cover the electrical circuit when the circuit back cover is installed on the wall plate. The powered wall plate may further comprise a control switch positioned on the front surface and electrically coupled to the at least one light, the control switch configured to control the supply of power to the at least one light. The control switch may have an on position, an off position, and an auto position, wherein the control switch is configured to turn on the at least one light when the control switch is in the on position, turn off the at least one light when the control switch is in the off position, and selectively turn on the at least one light when the control switch is in the auto position based on an ambient light level. The powered wall plate may further comprise a photocell exposed on wall plate, electrically coupled to the electrical circuit and to the at least one light, and configured to measure the ambient light level.

Aspects of this document relate to a powered wall plate, comprising a wall plate having a front surface opposite a rear surface and at least one opening extending through the front surface and the rear surface sized to expose a first electrical receptacle of an electrical device therethrough, at least two electrical plug prongs extending rearward from the rear surface, the at least two electrical plug prongs configured to removably mate with a second electrical receptacle of the electrical device, at least one mounting screw aperture extending through the wall plate and configured to receive at least one mounting screw to attach the wall plate to the electrical device, an electrical circuit located between the front surface and the rear surface and electrically coupled to the at least two electrical plug prongs, and an electrical feature exposed on the wall plate, electrically coupled to the electrical circuit, and configured to receive power from the at least two electrical plug prongs through the electrical circuit.

Particular embodiments may comprise one or more of the following features. The wall plate may have a profile with a first thickness and a second thickness and the second thickness may be less than three times the first thickness. The rear surface may comprise a removable circuit back cover configured to cover the electrical circuit when the circuit back cover is installed on the wall plate. The electrical circuit may comprise a printed circuit board, the at least two electrical plug prongs may be directly coupled to the printed circuit board, and the at least two electrical plug prongs may extend through the circuit back cover. The electrical feature may comprise at least one light. The powered wall plate may further comprise a control switch electrically coupled to the at least one light, the control switch configured to control the supply of power to the at least one light. The control switch may have an on position, an off position, and an auto position, wherein the control switch is configured to turn on the at least one light when the control switch is in the on position, turn off the at least one light when the control switch is in the off position, and selectively turn on the at least one light when the control switch is in the auto position based on an ambient light level. The powered wall plate may further comprise a photocell exposed on wall plate, electrically coupled to the electrical circuit and to the at least one light, and configured to measure the ambient light level. The powered wall plate may further comprise a control switch electrically coupled to the electrical feature, the control switch configured to control the supply of power to the electrical feature.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 10C is a rear perspective view of the plug-in module.

FIG. 10D is a view of the plug-in module current transfer unit.

DETAILED DESCRIPTION

Figure 1:
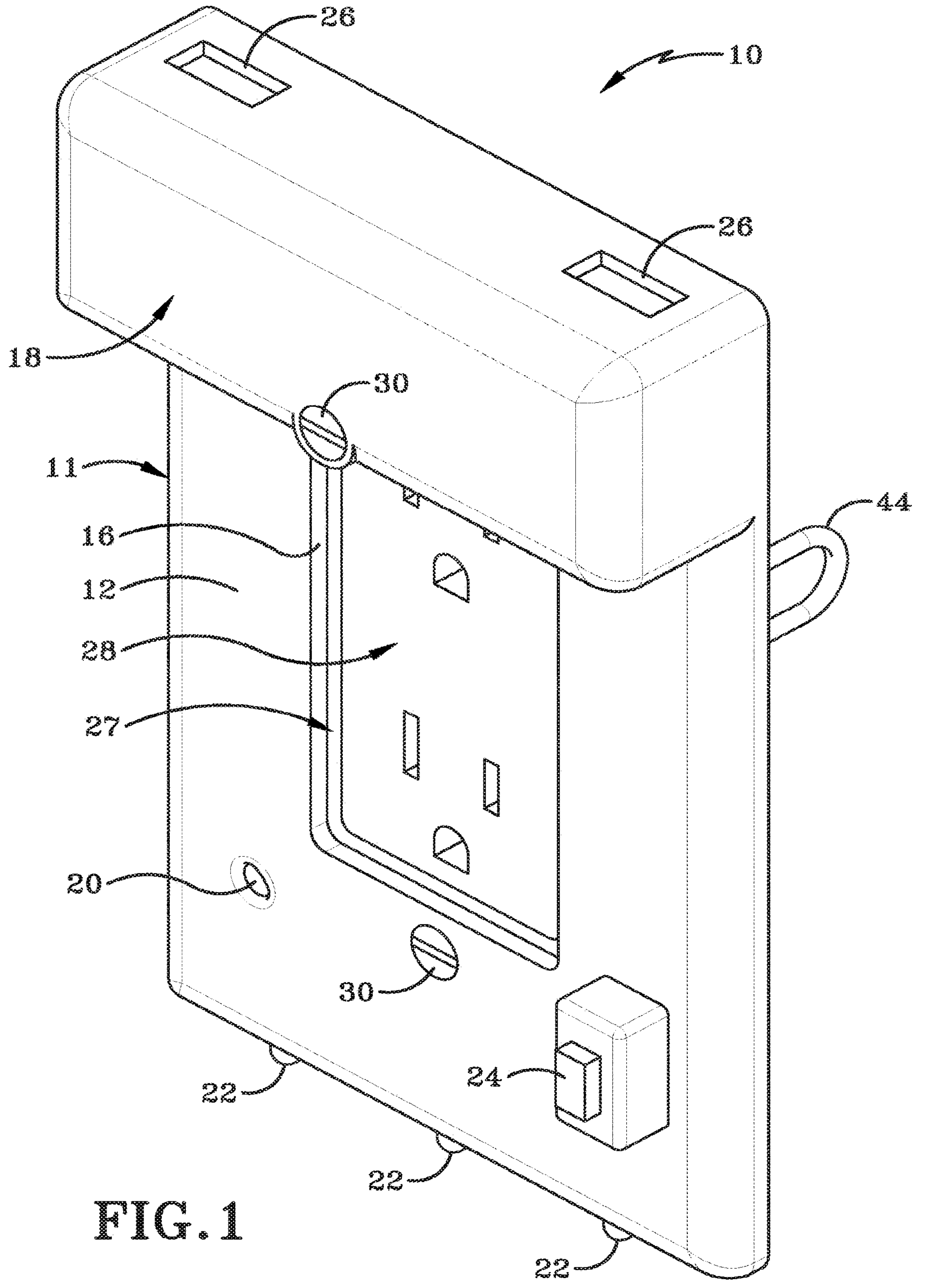
FIG. 1 is a perspective view of a first embodiment powered wall plate.
Figure 2:
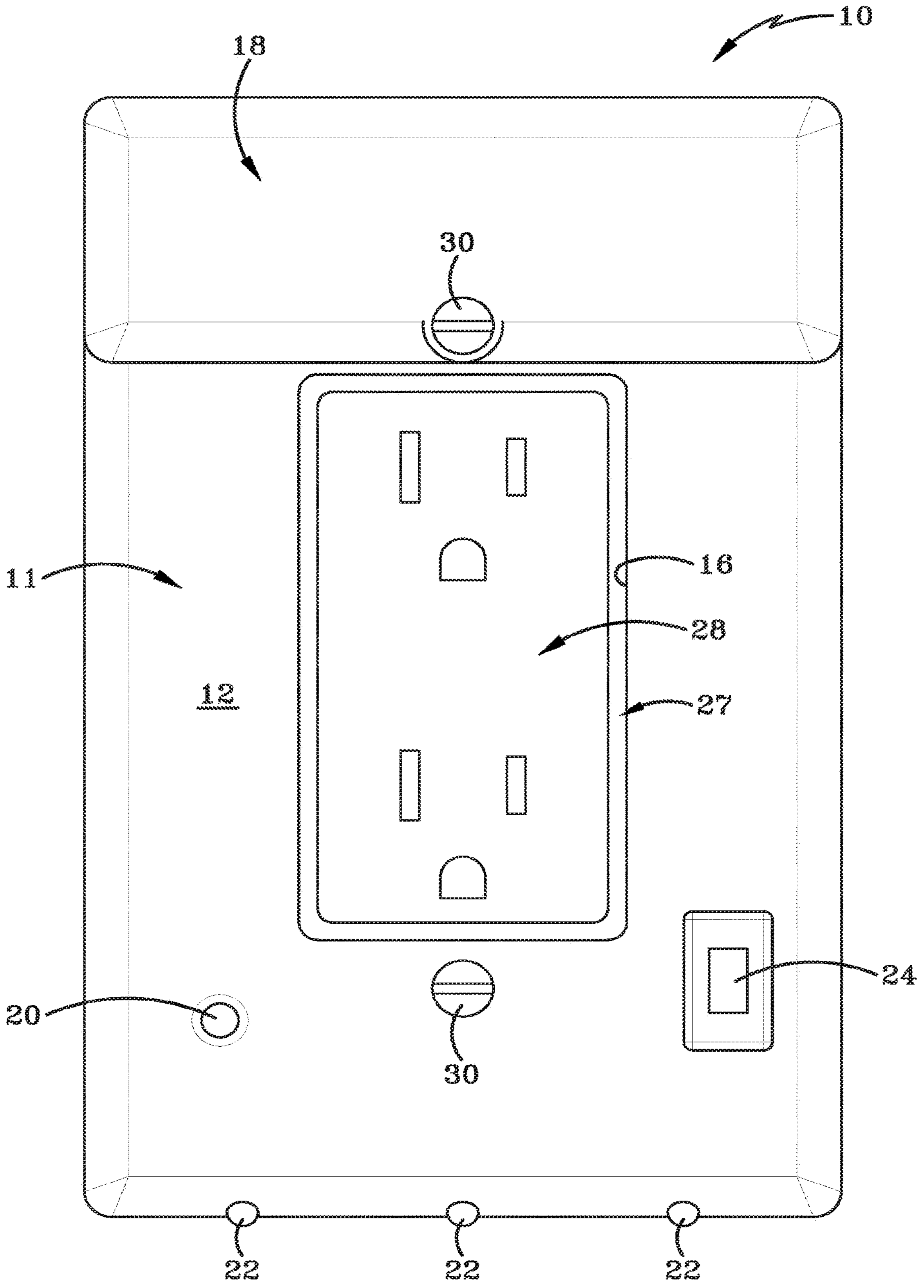
FIG. 2 is a front view of the powered wall plate.
Figure 3:
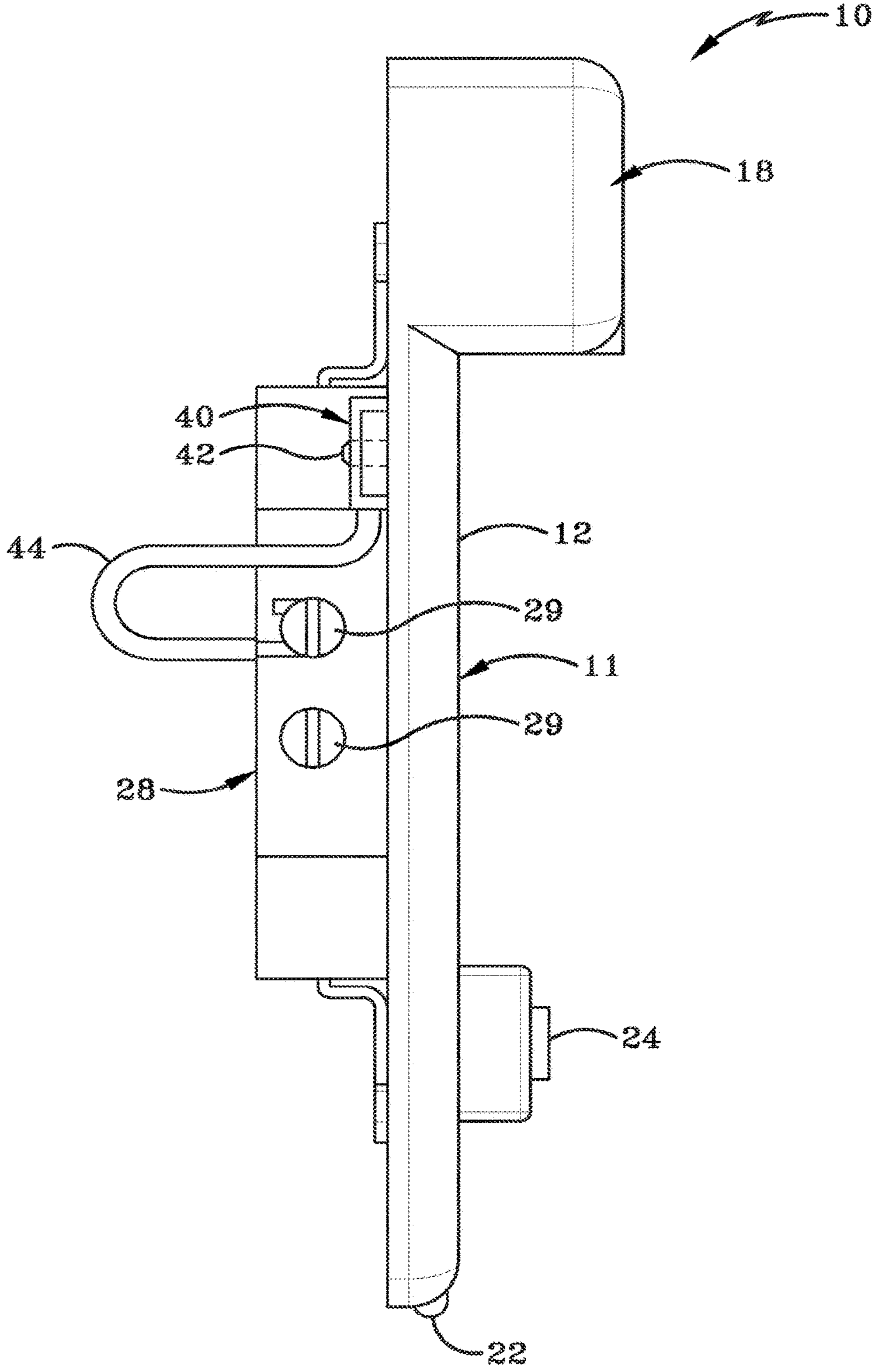
FIG. 3 is a left side view of the powered wall plate.
Figure 4:
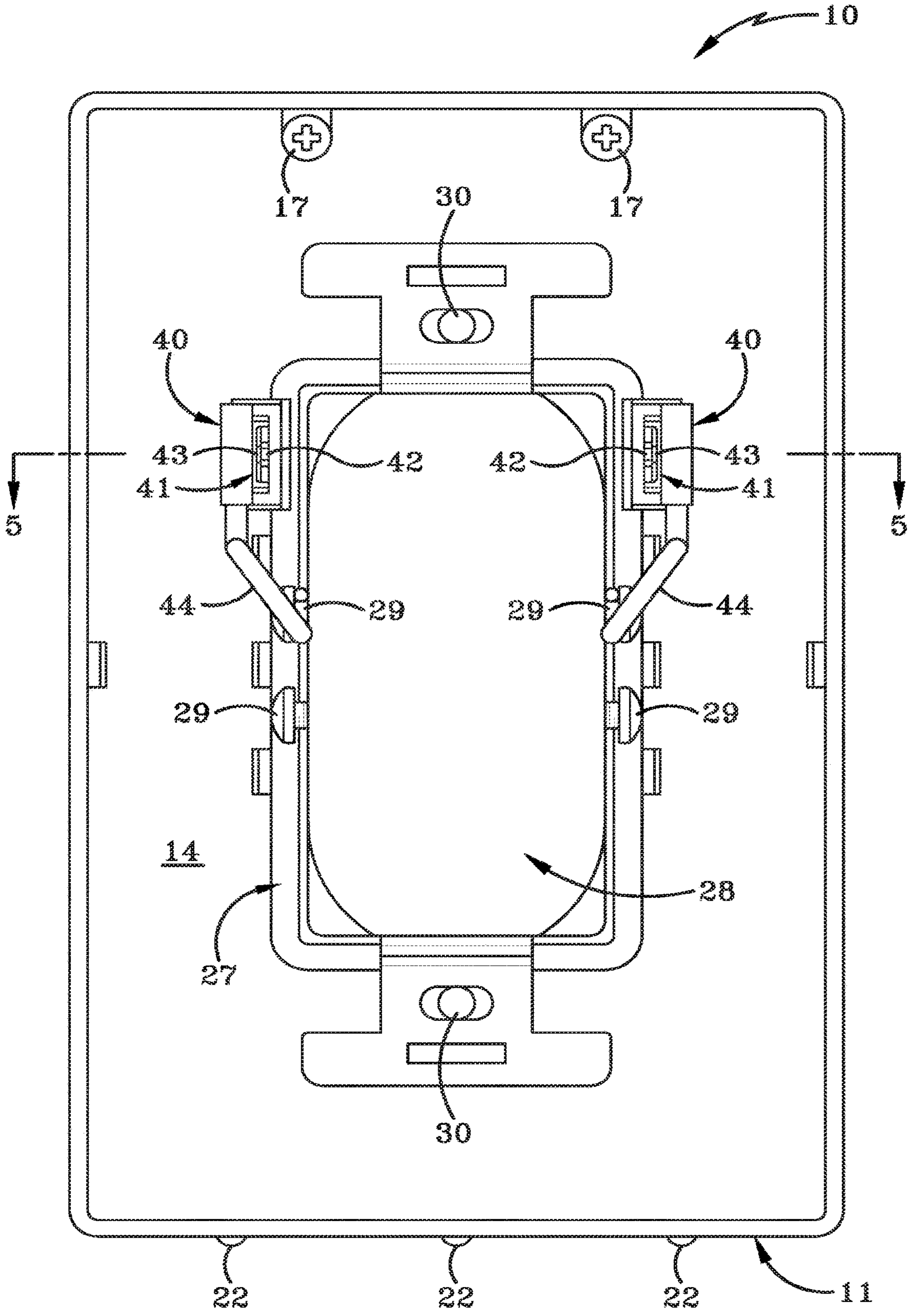
FIG. 4 is a rear view of the powered wall plate.

This disclosure, its aspects and implementations, are not limited to the specific components or assembly procedures disclosed herein. Many additional components and assembly procedures known in the art consistent with the intended operation and assembly procedures for a powered wall plate will become apparent for use with implementations of a powered wall plate from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a powered wall plate.

FIGS. 1 through 6 illustrate a first embodiment powered wall plate 10 having a body 11 with a front surface 12 and a rear surface 13. The powered wall plate may include a back plate 14 positioned behind rear surface 13 and secured in place with a plurality of screws 17. An opening 16 extends through the front surface 12 and the rear surface 13 to allow an electrical device 28 to be accessible. A transformer portion 18 maybe positioned on the top, bottom or sides of the powered wall plate and includes a circuit board 15 operatively arranged to control inputs and outputs for a photocell 20, LED or other suitable lights 22, a control switch (on/off/auto) 24, and power USB ports 26. Additional components or features may readily be included without departing from the spirit and scope of the present disclosure.

Powered wall plate 10 is secured to electrical device 28 or the electrical box with screws 30 and an adapter 27 which is complimentary shaped to the electrical device 28. For example, since electrical device 28 may be shaped or sized differently, an appropriate adapter will be utilized. Electrical device 28 includes current mounting screws 29 which are adapted to receive electrical wires 44. Electrical wires 44 connect at current mounting screws 29 and hard wire current transfer plug 40 which connects to wall plate current feature 42.

Moving to hard wire current transfer plug 40 in more detail, an electrode transfer portion 41 includes a current transfer contact 43 which is secured within the housing of current transfer plug 40 for each current path. Accordingly the current transfer plug can easily slide onto wall plate current feature 42 to securely and efficiently transfer electrical current from wire 44 and ultimately electrical device 28 to the wall plate through wall plate current feature 42 and into a wall plate interface 39 as seen in FIG. 6 with the current transfer plug 40 disconnected from wall plate current feature 42 and then connected in FIG. 5. Wall plate interface 39 then carries current to circuit board 15 to activate the LED lights, USB Power, control circuit, photocell, and any other features included on the powered wall plate.

Figure 5:
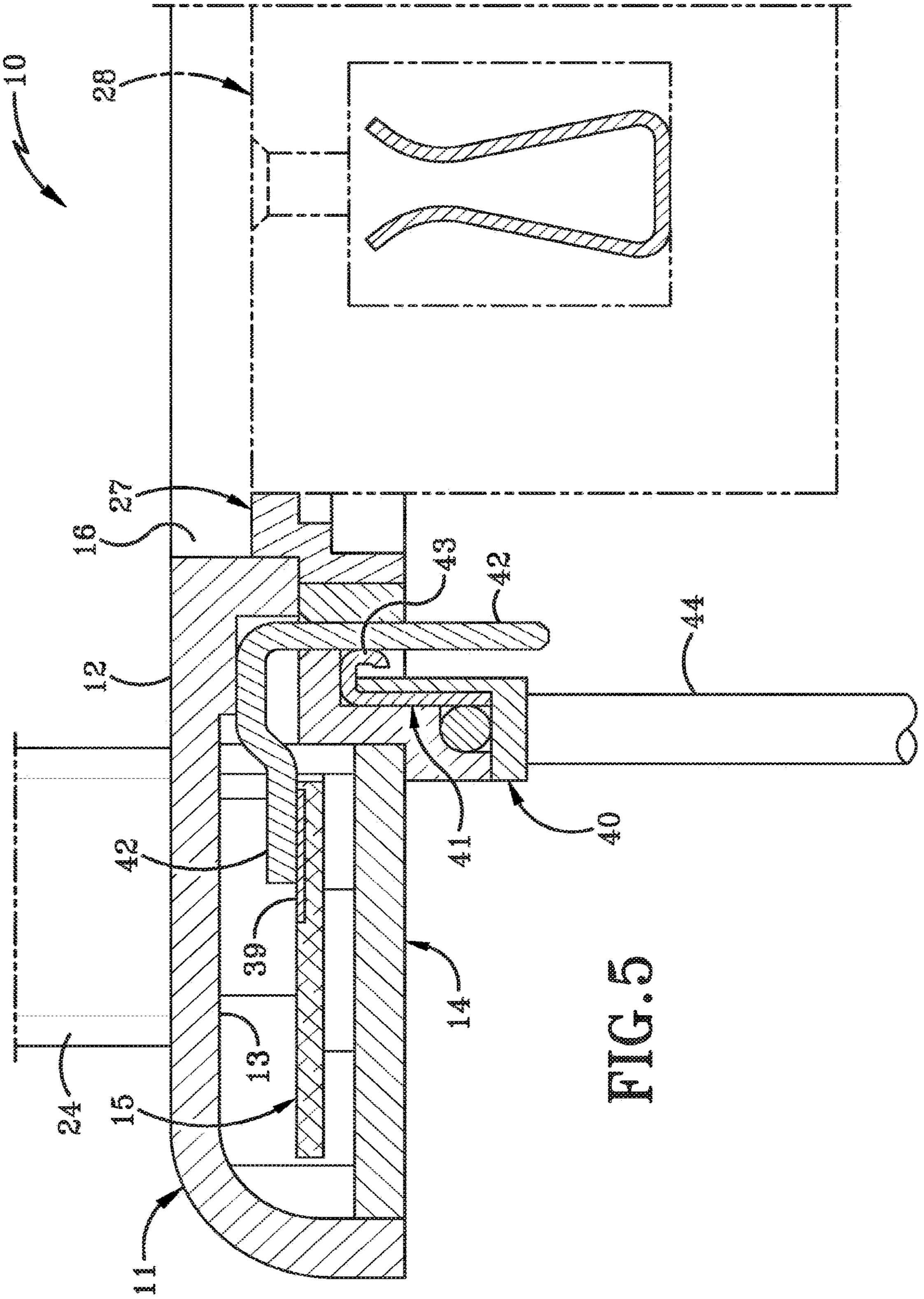
FIG. 5 is a sectional view taken generally about line 5-5 in FIG. 4.
Figure 5A:
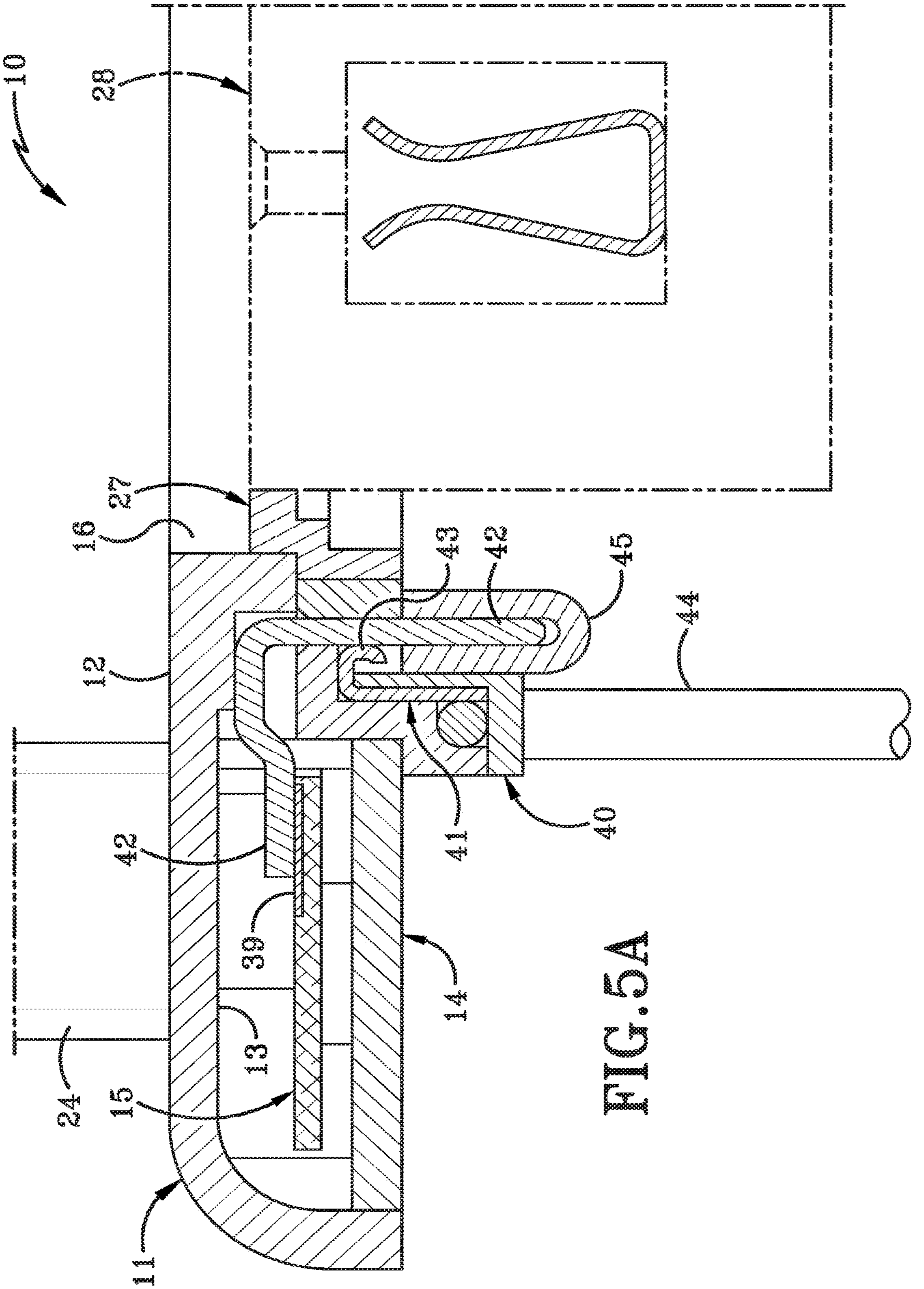
FIG. 5A is a sectional view taken generally about line 5-5 in FIG. 4 and including a cap.
Figure 6:
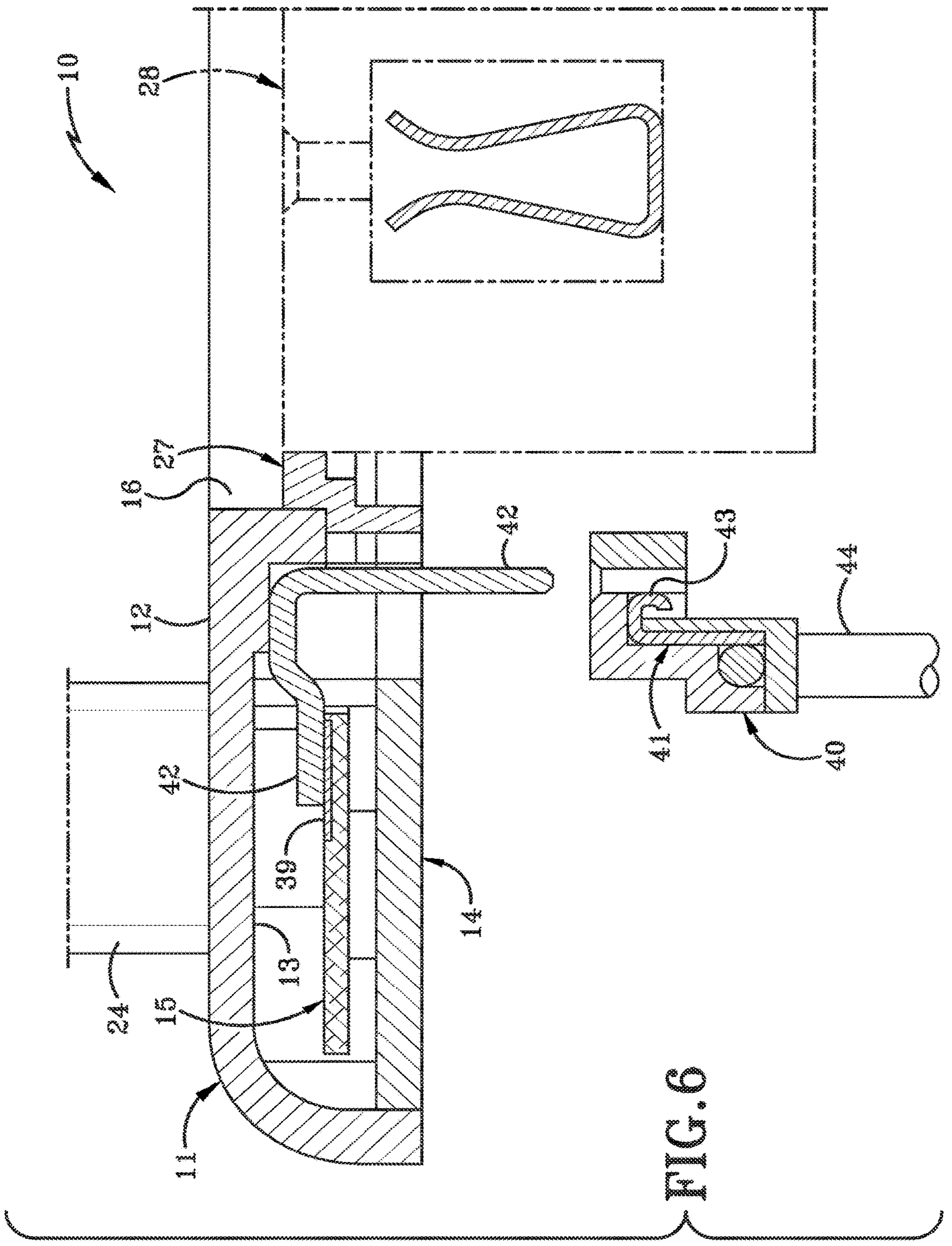
FIG. 6 is a sectional view taken generally about line 5-5 in FIG. 5 with the hardwire current transfer plug disconnected.

FIG. 5 illustrates a similar current transfer plug 40 which includes an additional cap 45. Cap 45 is structured and oriented so that it can fit over wall plate current feature 42 after current transfer plug 40 is positioned securely on wall plate current feature 42. In this orientation, cap 45 functions to significantly reduce the risk of electrical shock or electrical shorts from wires contact an exposed conductor as well as reducing the likelihood that current transfer plug 40 may be inadvertently removed.

Installation of the hard wired powered wall plate 10 is simple in that the installer removes the original wall plate and unscrews the electrical device mounting screws. Next, electrical wire 44 is connected to the electrical device current mounting screws 29 and reinstalls electrical device 28 within an electrical box. The current transfer plug 40 on the other end of electrical wire 44 is then connected to each wall plate current feature 42 before the powered wall plat 10 is secured with screws 30. The installer may then reenergize the circuit and have USB power, lighting, and control of the electrical current provided to wall plate 10. In one implementation, the installer may include an adapter around the opening 16 of the wall plate depending on the electrical device 28 used and may install a cap 45 to prevent electrocution or electrical shorts.

Advantageously, the powered wall plate can include any number of circuits to provide any number of usable features within the spirit and scope of the present disclosure. While examples include USB ports, LED lighting, a photocell, a control circuit, or the like, any suitable input, output, or control circuit may be implemented in the powered wall plate. Still further, the hard wire option shown in FIGS. 1-6 provides the advantage of using electrical current from the electrical device 28 securely and safely with electrical wires while still allowing all the electrical device apertures to be free and used from other appliances or components.

Figure 7:
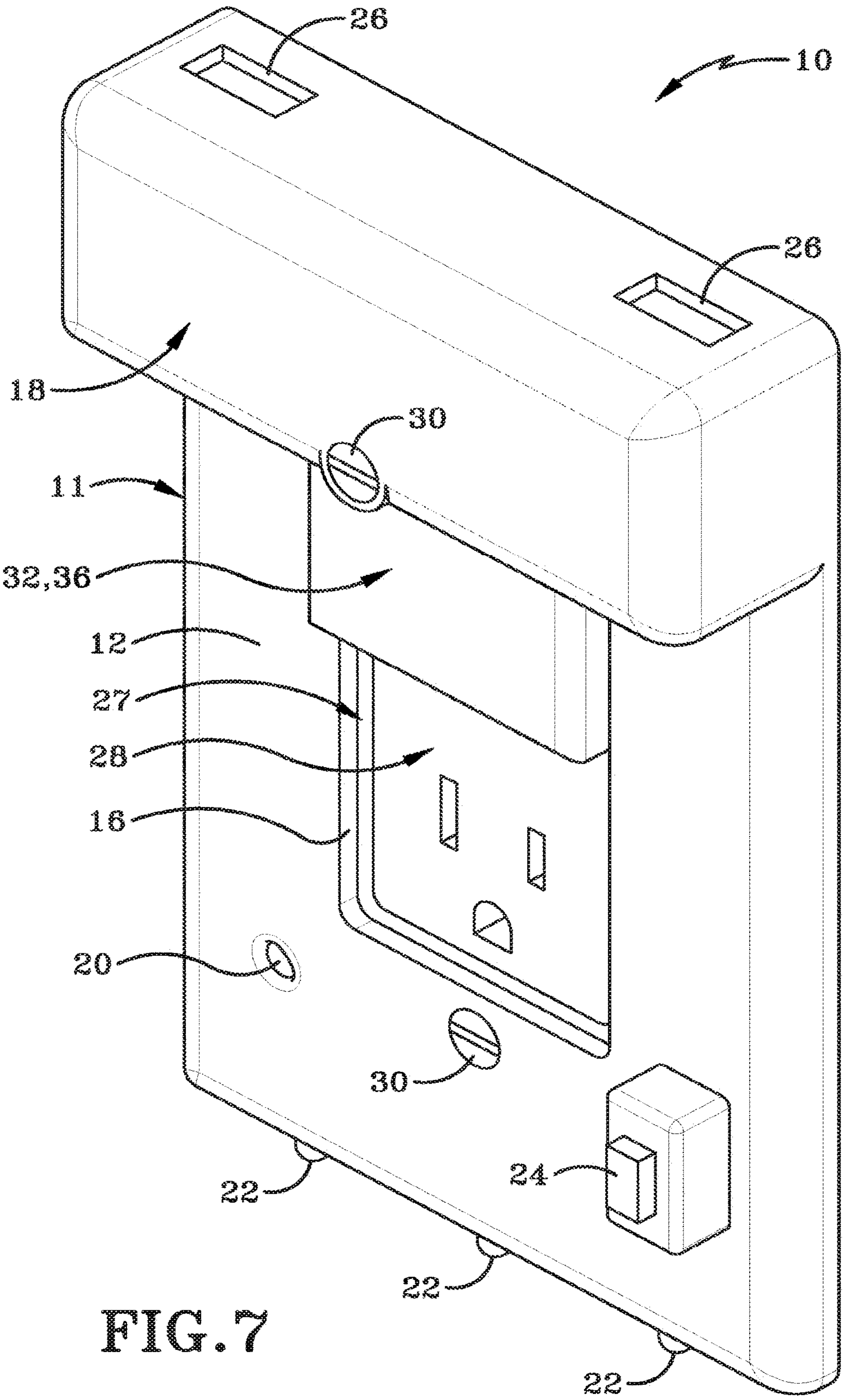
FIG. 7 is a perspective view of a second embodiment powered wall plate.
Figure 7A:
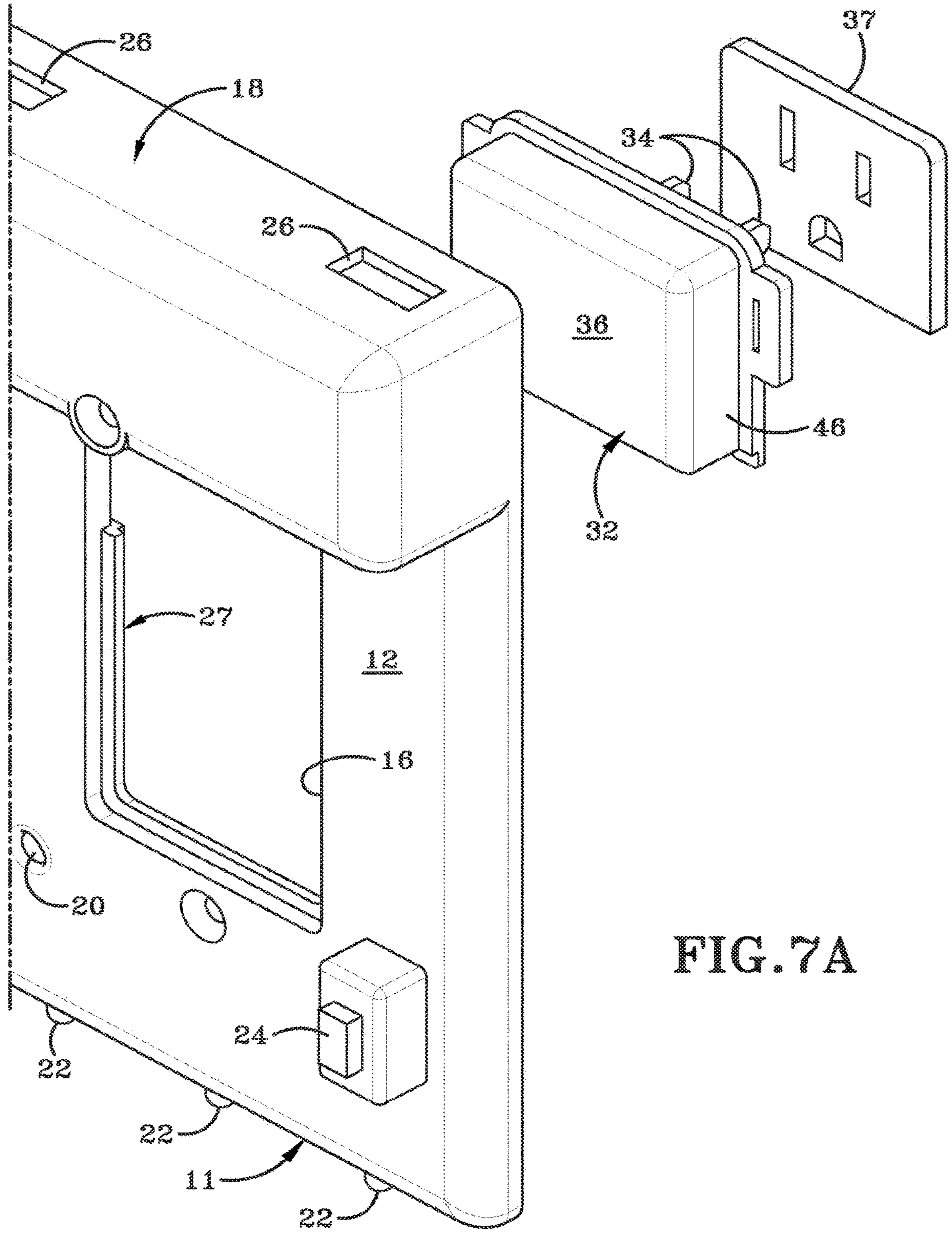
FIG. 7A is a exploded perspective view of the second embodiment powered wall plate.
Figure 8:
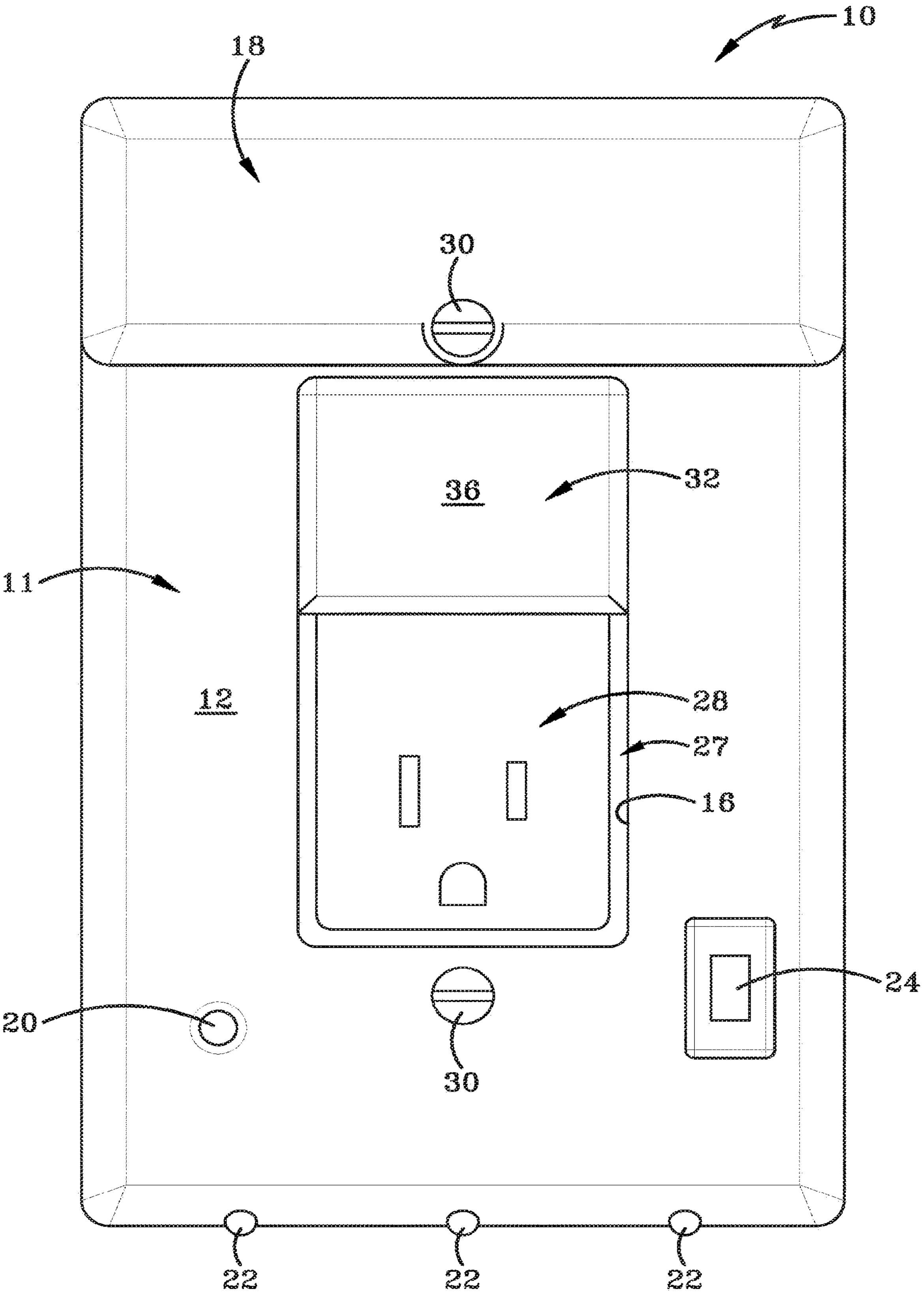
FIG. 8 is a front view of the second embodiment powered wall plate.
Figure 9:
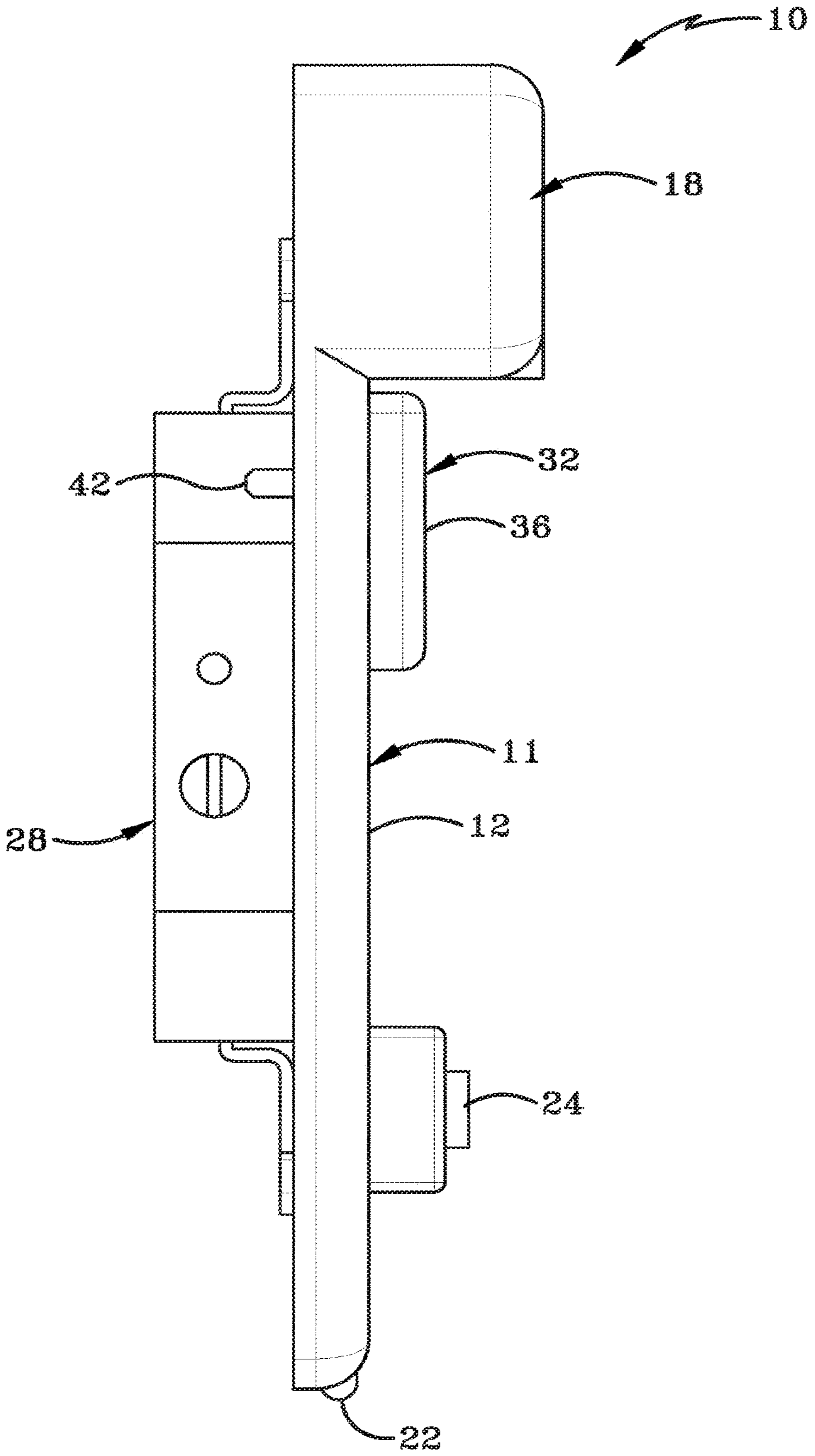
FIG. 9 is a left side view of the second embodiment powered wall plate.
Figure 10:
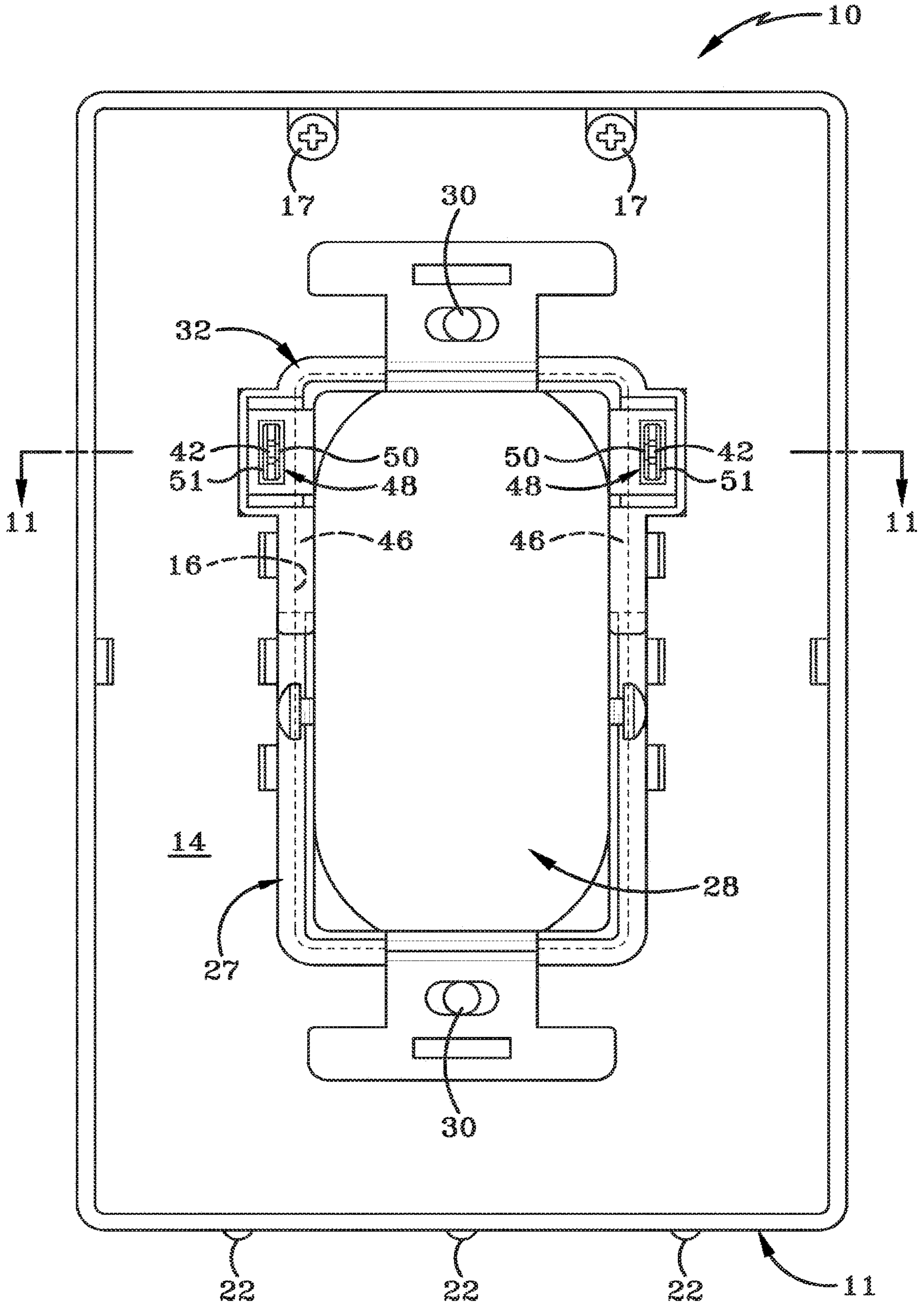
FIG. 10 is a rear view of the second embodiment powered wall plate.
Figure 10A:
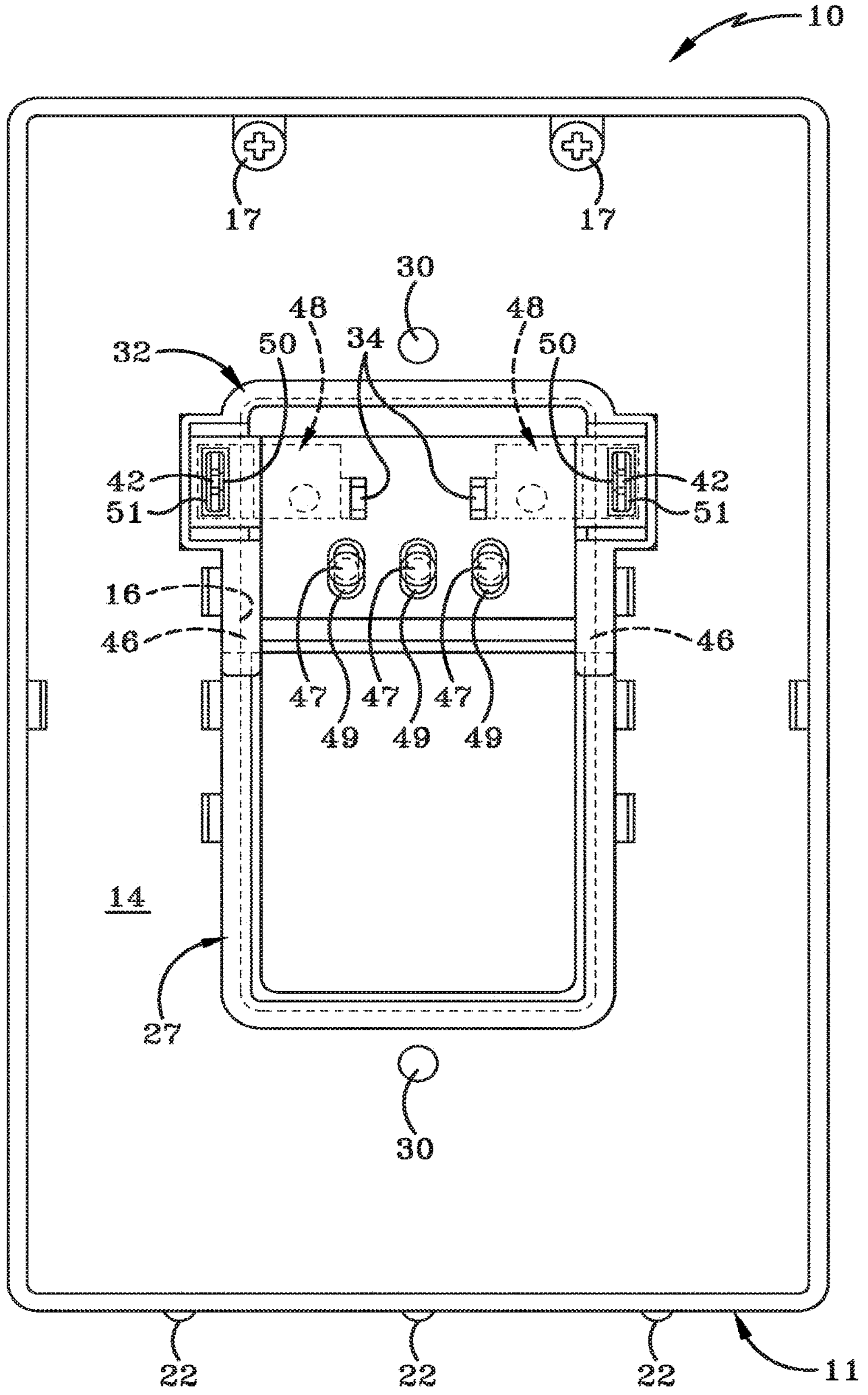
FIG. 10A is a rear view of the second embodiment powered wall plate with the electrical device removed.
Figure 10B:
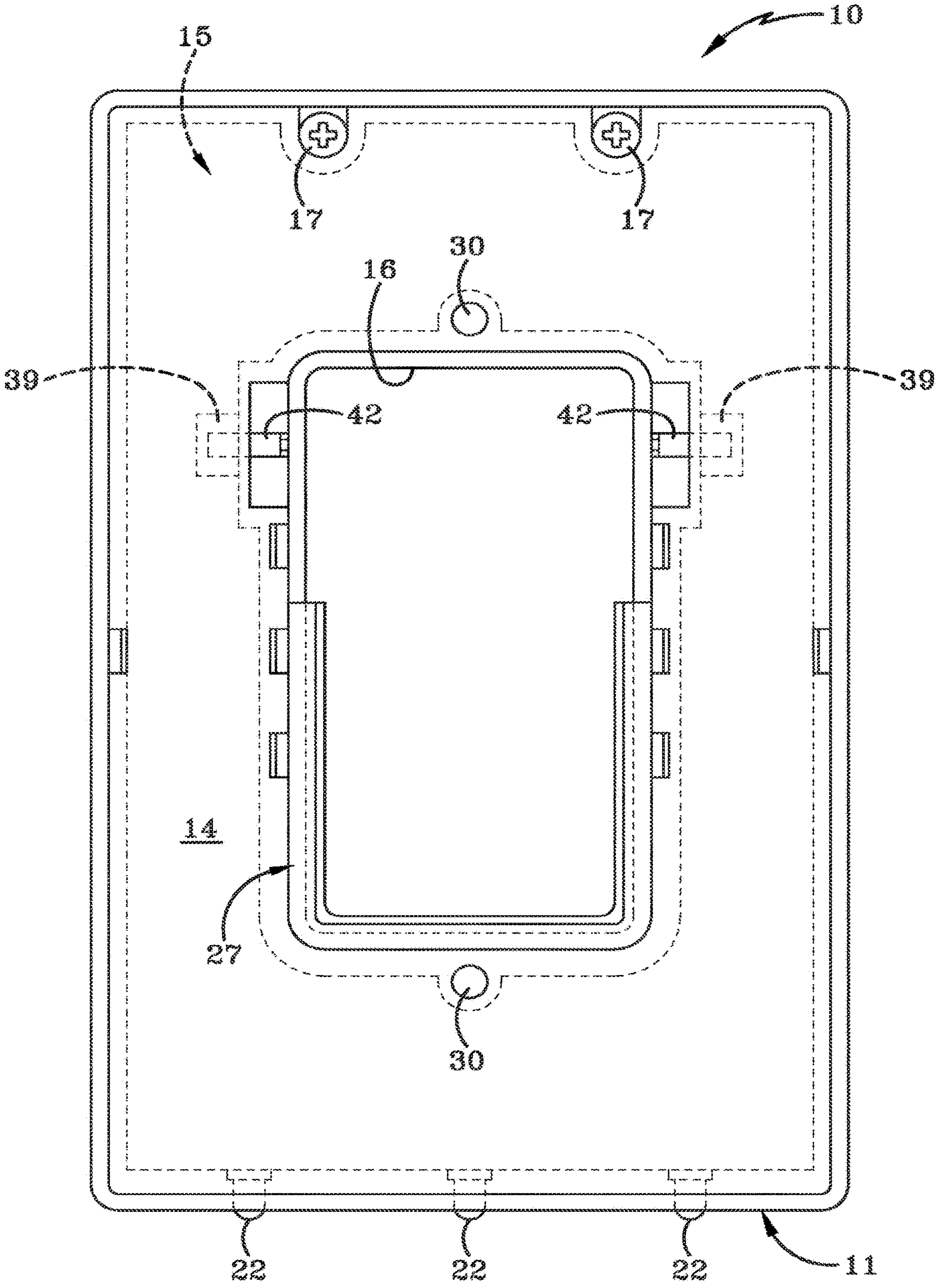
FIG. 10B is a rear view of the second embodiment powered wall plate with the electrical device and the plug-in module removed.
Figure 10E:
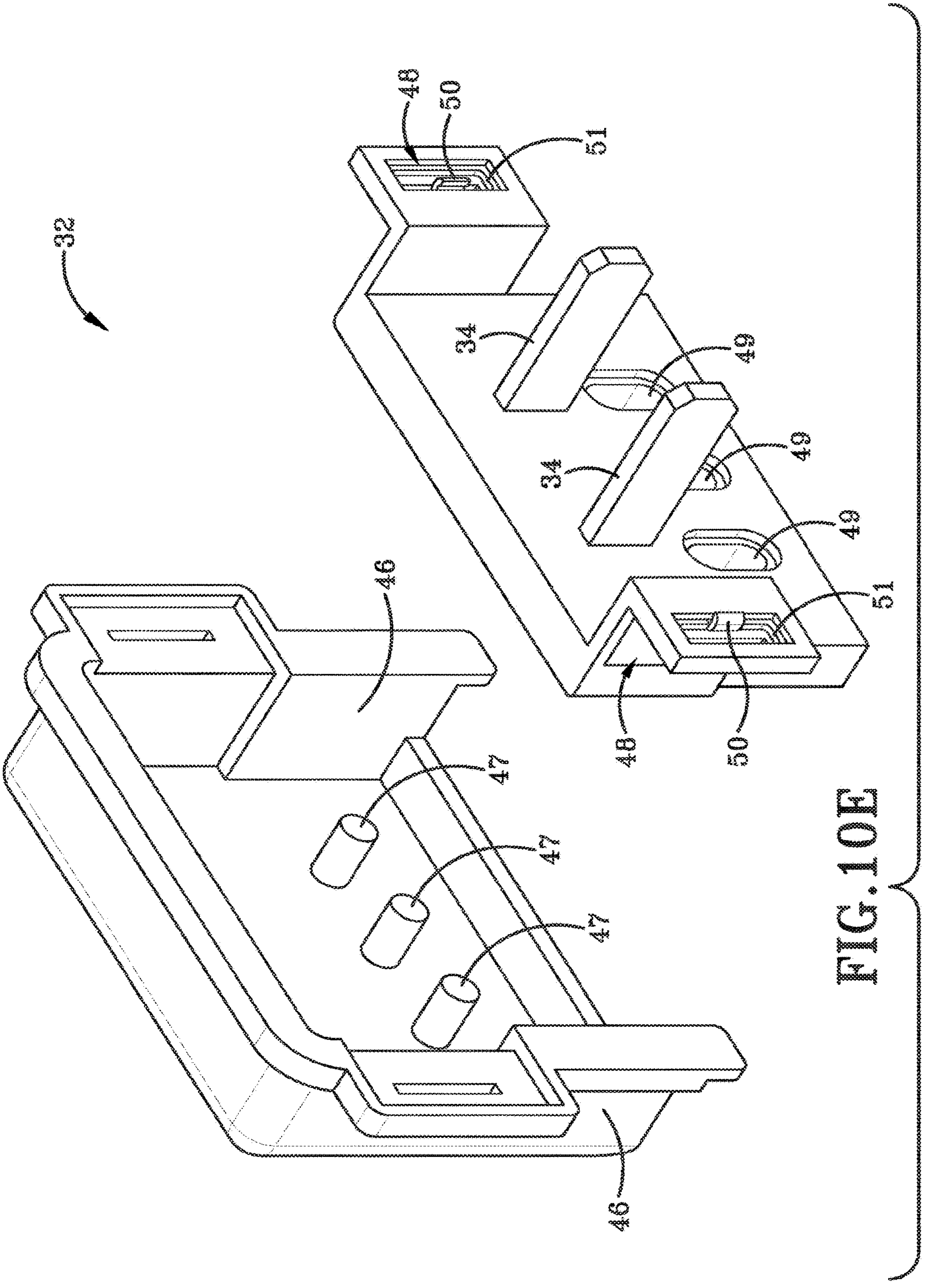
FIG. 10E is a rear exploded view of the plug-in module.

FIGS. 7 though 11A illustrate a second powered wall plate 10 which is structurally similar to the first embodiment powered wall plate described and show in FIGS. 1-6, but utilizes a plug-in module as will be described in more detail below. It is anticipated that the powered wall plate shown in FIGS. 1-11A may be sold with the components that could allow installation of either the hard wire version illustrated in FIGS. 1-6 or the plug-in module version shown more specifically in FIGS. 7-11A without departing from the sprit and scope of the present disclosure.

Wall plate 10 includes a plug-in module 32 having a front surface 36, prongs 34, and arms 46 extending outward from each side. Arms 46 each include a current transfer unit 48 having a current transfer contact 50 therein. Each current transfer contact 50 is operatively connected to prongs 34 to receive electrical current from the electrical device and transfer the electrical current to the circuit board via wall plate interface 39 and wall plate current feature 42 to power the wall plate. Each current transfer unit 48 may include an aperture 51 adapted to receive the wall plate current feature 42 adjacent current transfer contact 50.

Plug-in module 32 may also be oriented to slide plugs 34 upwards or downwards to ensure that the plug-in module can be utilized with any type of electrical device and still transfer electrical current to the wall plate current feature 42. For example, the plug-in module body may include rivets 47 arranged to receive apertures 49 which are elongated and may include a recessed portion. The recessed portion allows the rivets 47 to be compressed at the head and allow the plugs 34 to move upward and downwards relative to the rivets 47 but still be retained to prevent disconnection. This upward or downward relative movement may be important in some circumstances where device dimensions vary. Specifically, the distance between the powered wall plate mounting screw and the upper or lower electrical prong apertures on electrical device 28 may be different for a duplex receptacle, a decorator receptacle, or a GFCI receptacle for example or due to manufacturer styles. With the incorporation of this adjustable feature, the powered wall plate 10 is designed to work regardless of the device style or manufacturer, saving time, energy, and retailer stocking needs.

The plug-in module 32 may also include spring biased shutters 71 which surround plugs 34. Shutters 71 are compressed by the electrical device front face when the wall plate is appropriately positioned or are used to ensure that a user is not electrocuted if a portion of electrical plug 34 would otherwise be visible due to a gap between the wall plate and the electrical device. Operation is simple and the spring is biased to the extended position and compressed as appropriate, thereby prevent direct access to the plugs 34 by a user after installation but still allowing full plug prong insertion if possible. If spring biased shutters 71 are omitted, a spacer 37 may be utilized to restrict access to the prongs 34 and prevent electrocution. Installation of the powered wall plate with the plug-in module includes positioning the plug-in module 32 on the wall plate current feature 42, then installing the wall plate on the electrical device and potentially sliding the plug-in module prongs 34 upwards or downwards slightly to align with the electrical device. Finally, the powered wall plate 10 is secured to the electrical box or electrical device with screws 30. In an alternative installation, the plug-in module 32 is positioned in the electrical device and the wall plate is then positioned so the wall plate current features 42 fit within aperture 51 of arms 46, thereby connecting the plug-in module 32 and the wall plate 10 to transfer current. Regardless of the order of the steps used to install the powered wall plate, the plug-in module 36 provides a simple and efficient way to power the wall plate without hard wiring and may instead be used as a user selected alternative to hard wiring.

Figure 11:
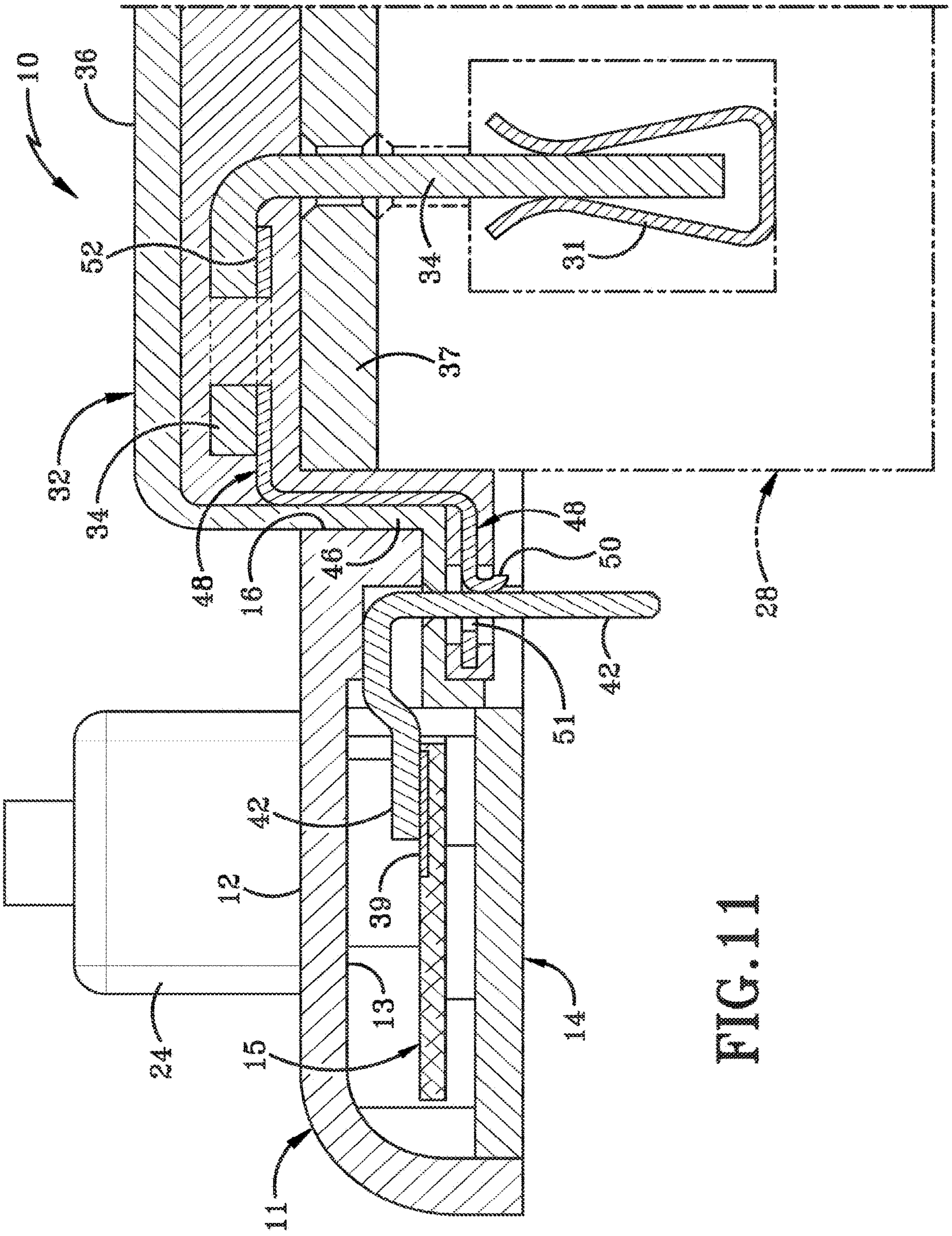
FIG. 11 is a sectional view taken generally about line 11-11 in FIG. 10.
Figure 11A:
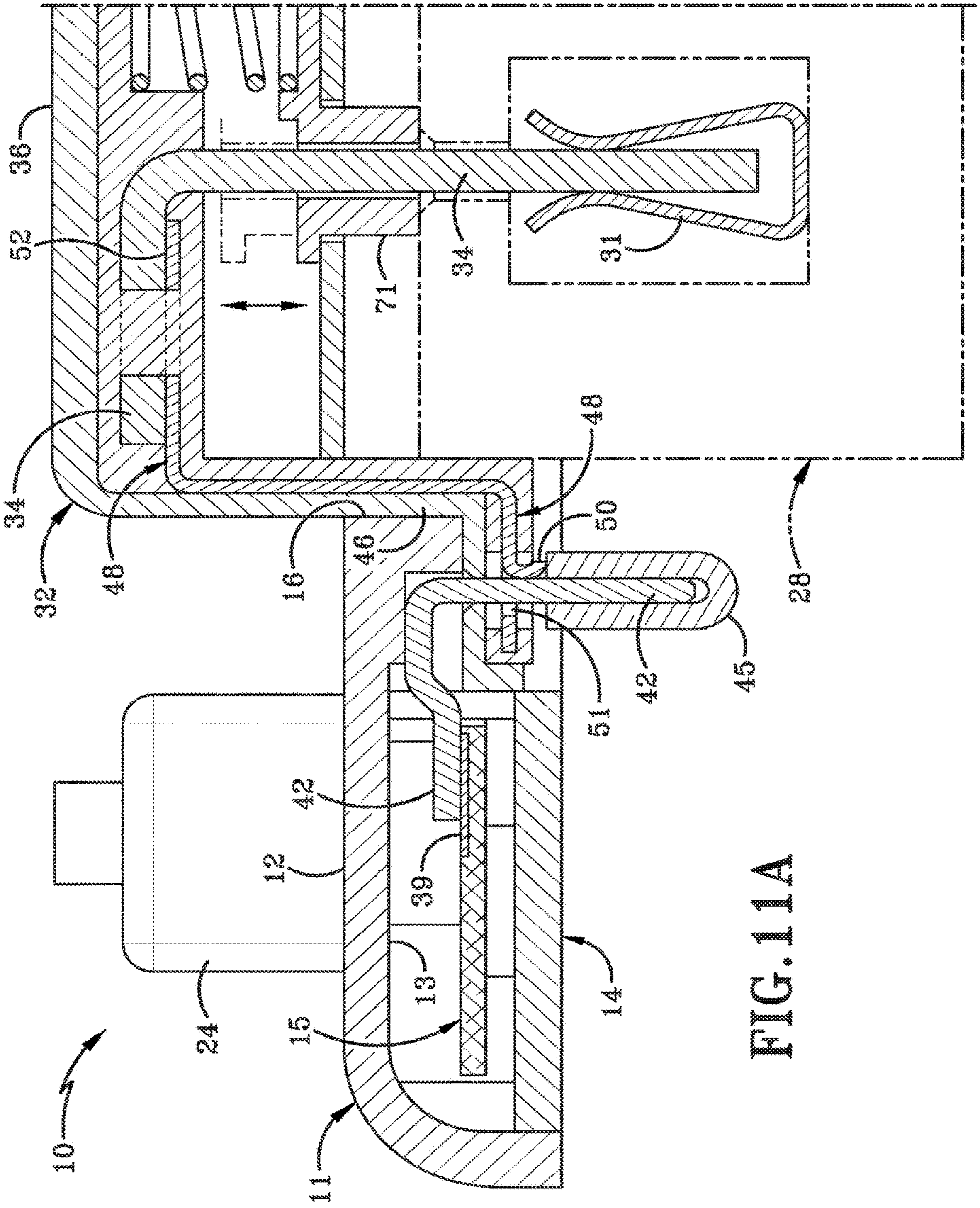
FIG. 11A is a sectional view taken generally about line 11-11 in FIG. 10 and including a cap.

FIG. 11A illustrates another implementation with a cap 45 positioned on the wall plate current feature 42. Thus it is seen that electrical current is easily transferred from the electrical device to the wall plate in a safe and efficient manner.

While FIGS. 7-11A illustrate the plug-in module 32 being positioned on only the upper electrical device openings, it is within the spirit and scope of the present disclosure to position the plug-in module in the lower electrical device openings. A person of skill in the art will appreciate that the powered wall plate will simply need to position wall plate current features 42 consistent with the lower electrical device openings. An alternative implementation would be to include multiple sets of wall plate current features 42 at strategic positions on wall plate 10 and utilize caps 45 where necessary to prevent current transfer or electrocution.

Figure 12:
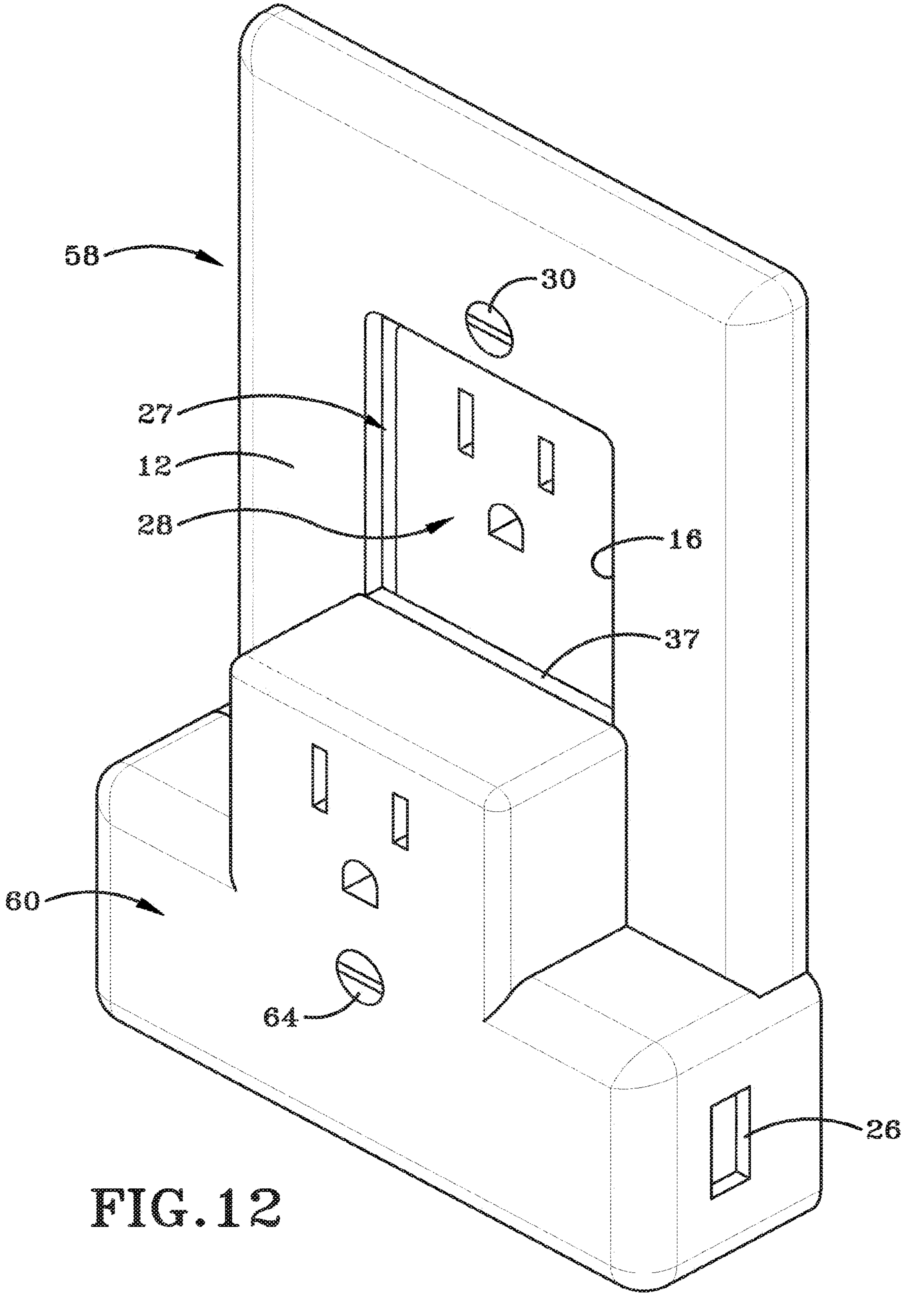
FIG. 12 is a perspective view of a third embodiment powered wall plate.
Figure 13:
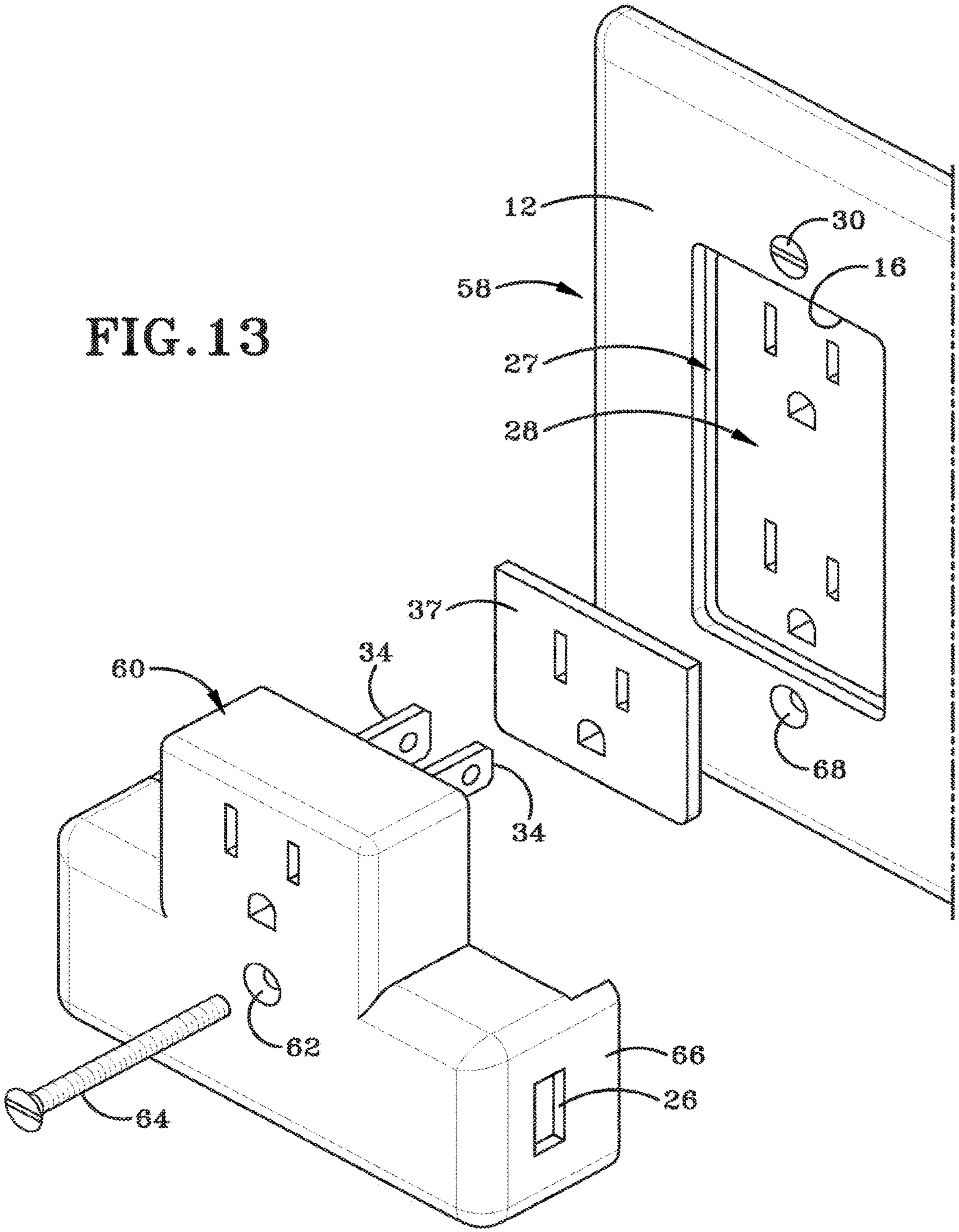
FIG. 13 is an exploded view of the third embodiment powered wall plate.
Figure 14:
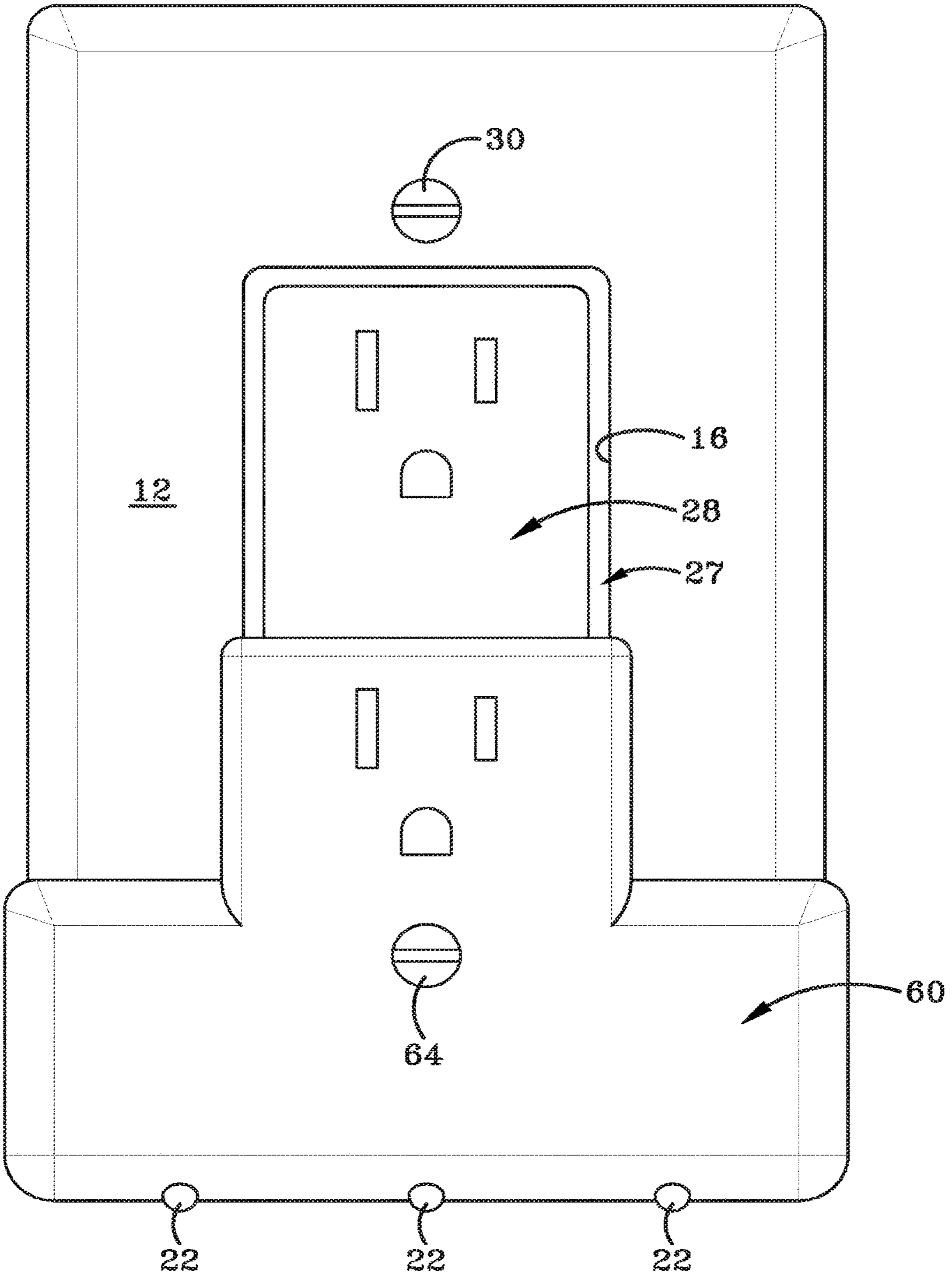
FIG. 14 is a front view of the third embodiment powered wall plate.

FIGS. 12-14 illustrate a third aspect powered wall plate 58 having a body 12 and a plug-in module 60. Plug-in module 60 in this implementation may be larger and include a power transformer, USB ports 26, lights 22, a photosensor, controls, and other features.

Advantageously, plug-in module 60 may also include a through hole 62 aligned with a wall plate mounting aperture 68 both arranged to receive a screw 64. In this manner, wall plate body 12 is installed with screw 30, then plug-in module 60 is installed into the electrical device with prong 34 (and spacer 37 if required). Screw 64 is then positioned through holes 62 and 68 to secure the components together with surrounds 66 covering a portion of body 12 to provide an aesthetically pleasing appearance. This way the plug-in module 60 functions like similar illustrations but is easier to install and operate.

Figure 15:
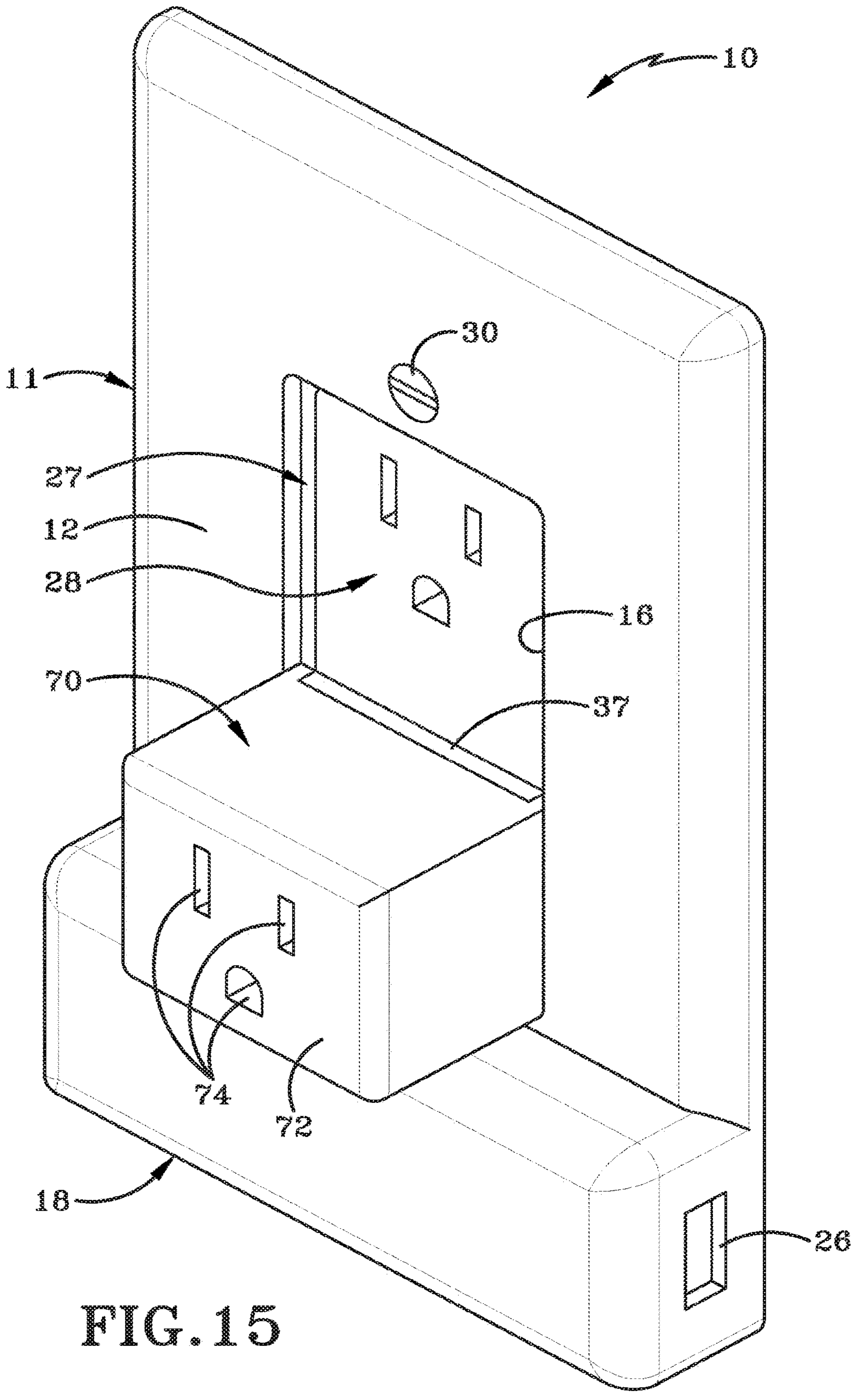
FIG. 15 is a perspective view of a fourth embodiment powered wall plate.
Figure 15A:
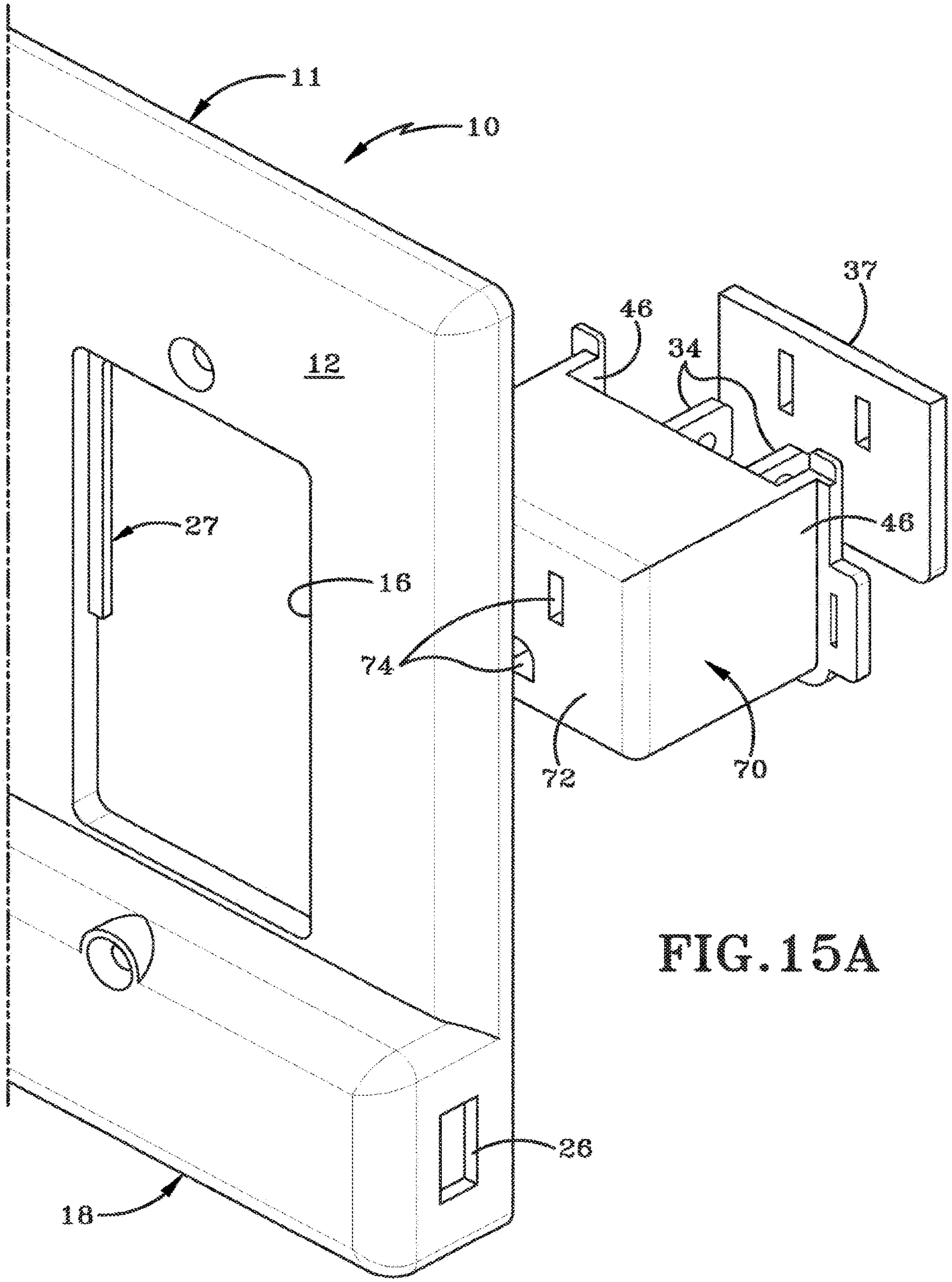
FIG. 15A is an exploded view of the fourth embodiment powered wall plate.
Figure 16:
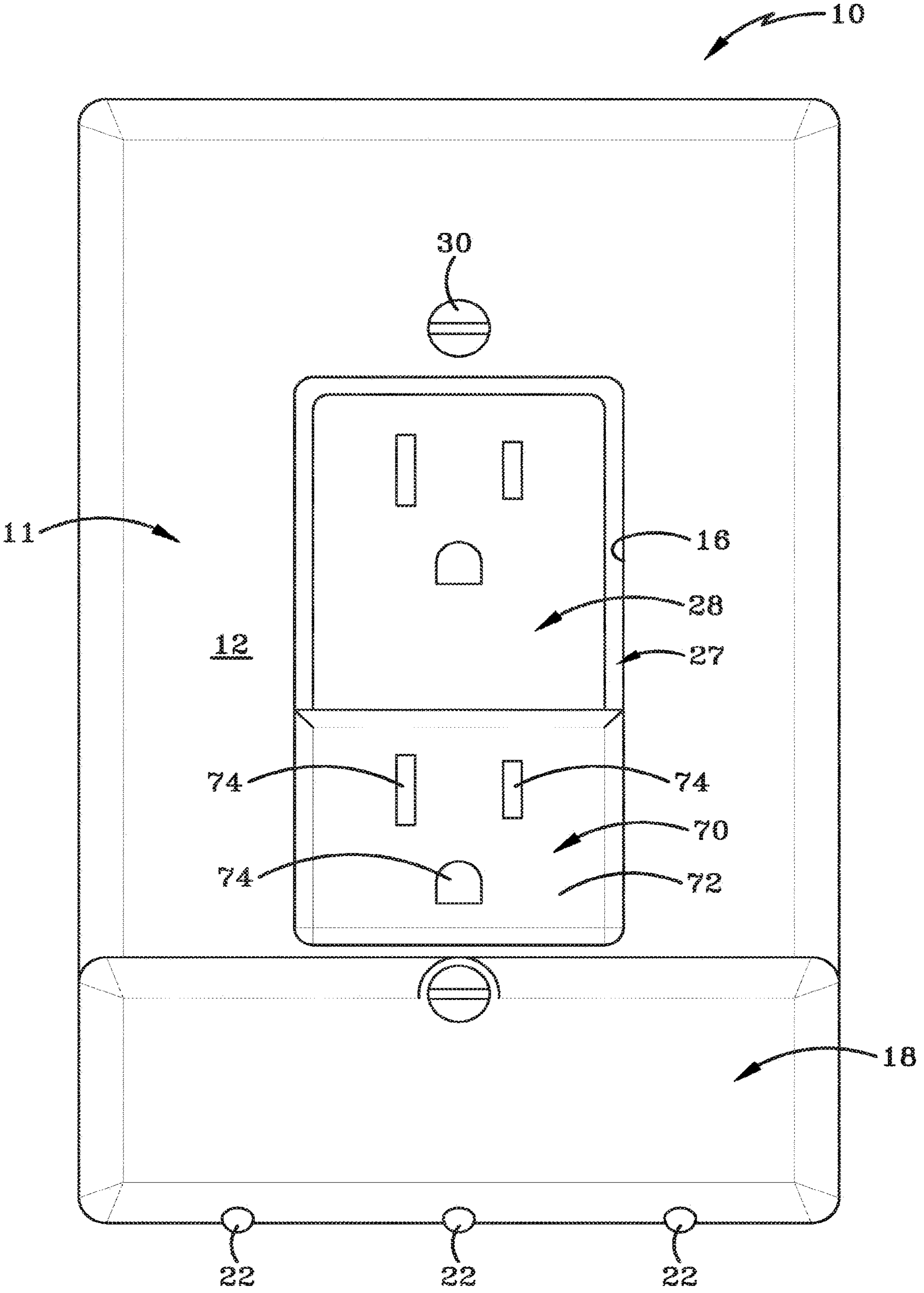
FIG. 16 is a front view of the fourth embodiment powered wall plate.
Figure 17:
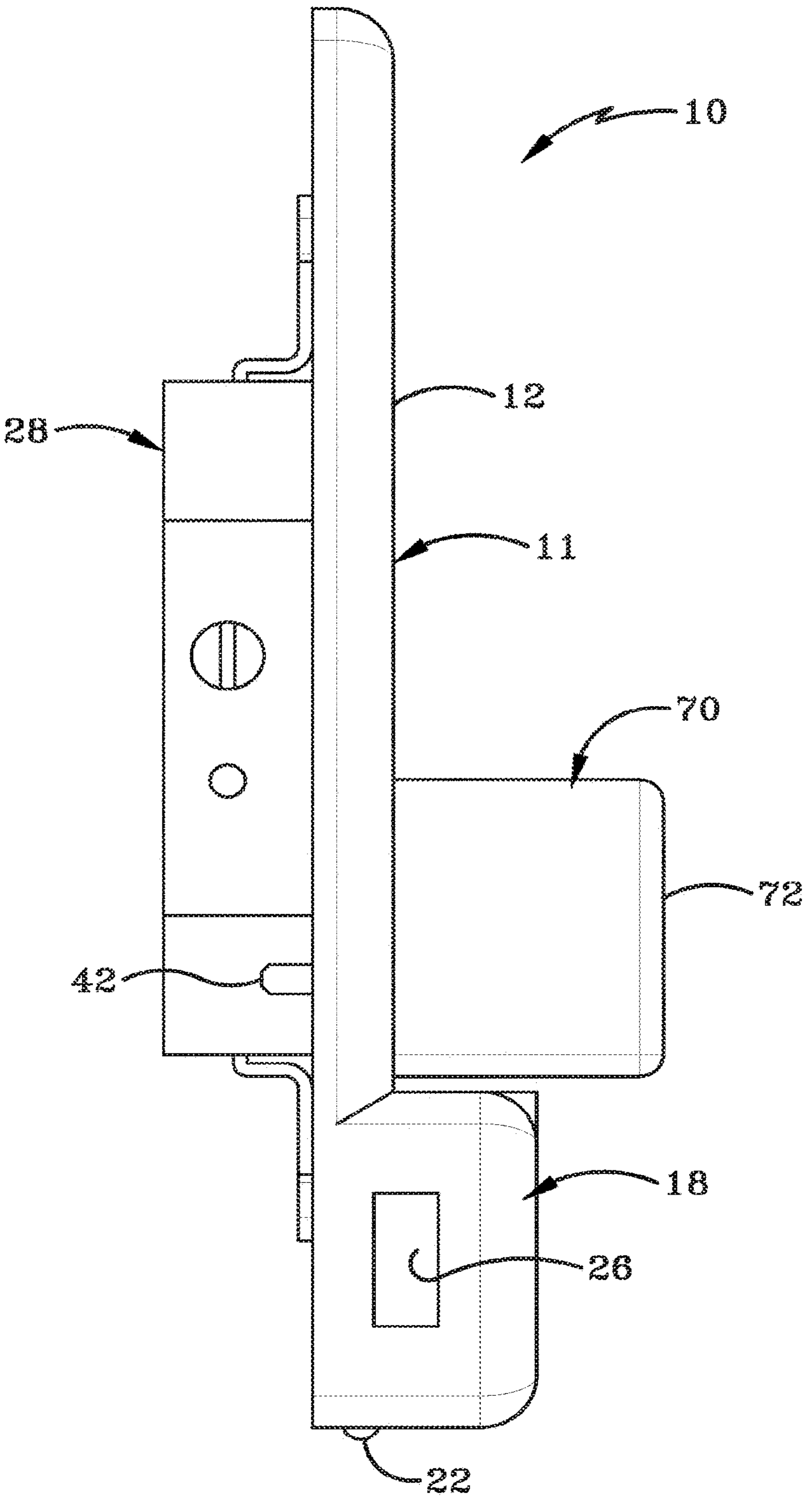
FIG. 17 is a side view of the fourth embodiment powered wall plate.
Figure 18:
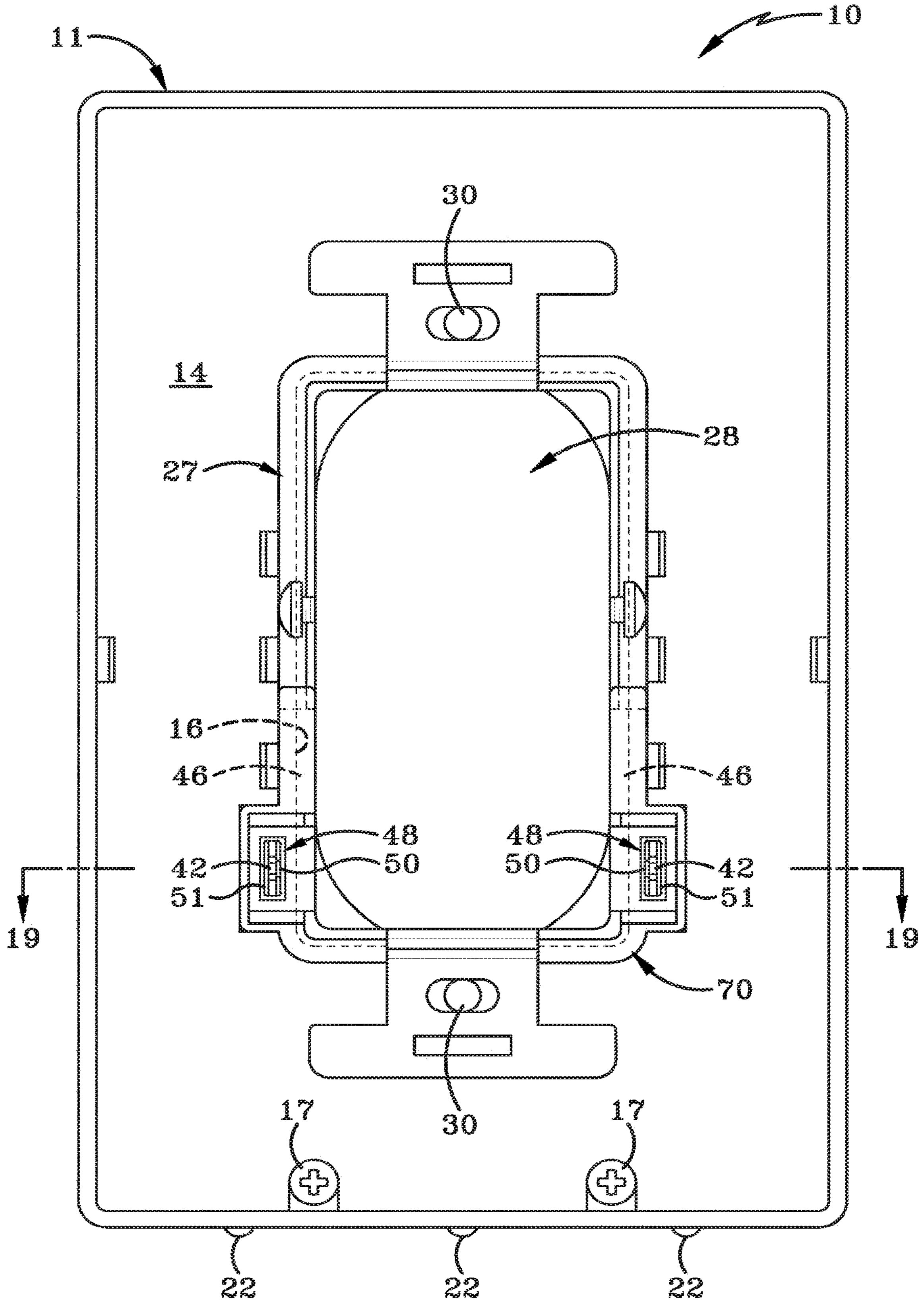
FIG. 18 a rear view of the fourth embodiment powered wall plate.
Figure 18A:
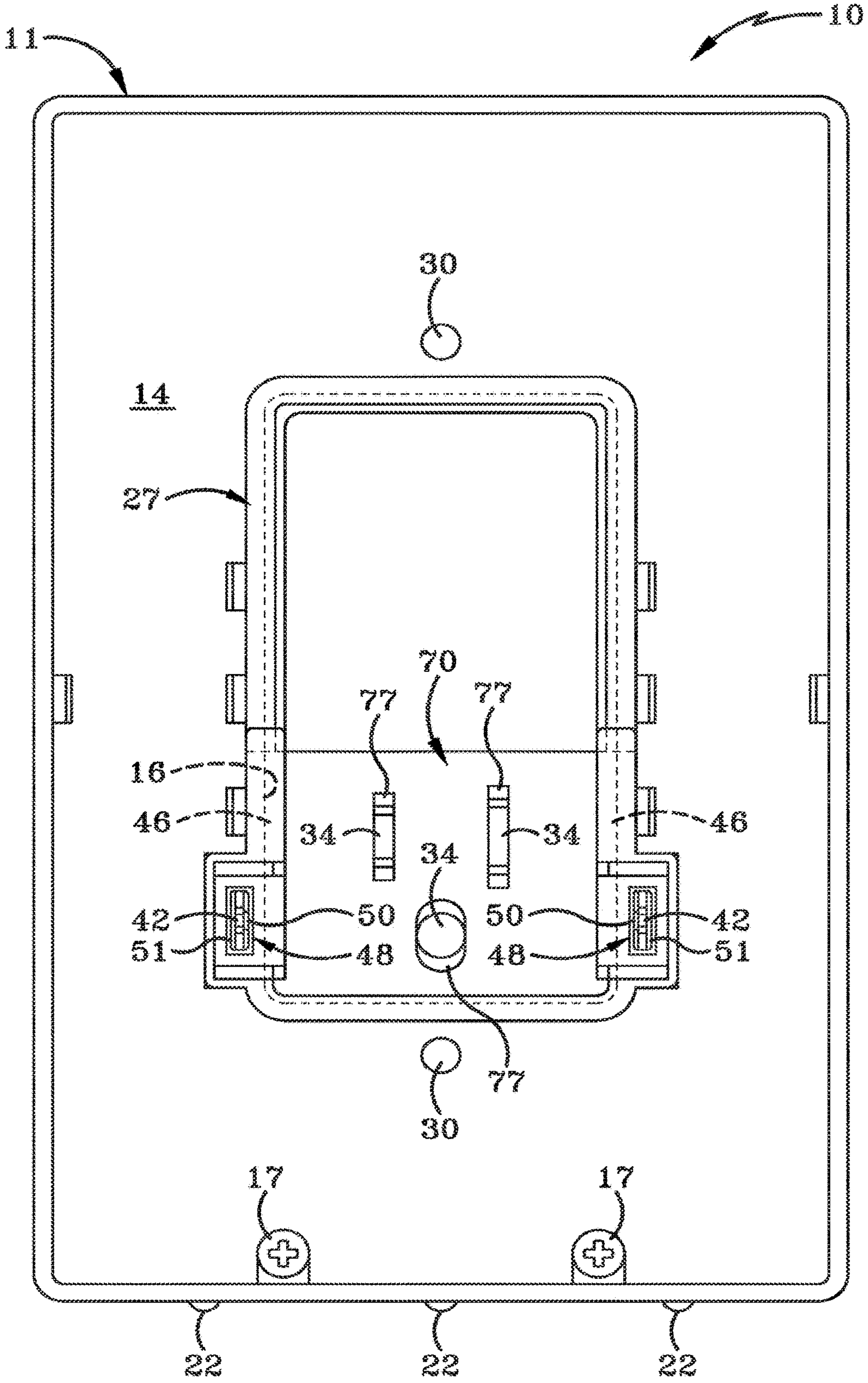
FIG. 18A is a rear view of the fourth embodiment powered wall plate with the electrical device removed.

FIGS. 15-19D illustrate a fourth aspect powered wall plate 10 having a plug-in module 70. As seen in the various views, plug-in module 70 is similar to plug-in module 32 but also includes a front surface 72 having a plurality of apertures 74 therein for receiving an electrical plug therein. In this manner, plug-in module 70 can be positioned within opening 16 of faceplate body 11 and transfer electrical current to powered wall plate 10 similar to previously disclosed embodiments but still provide a plurality of apertures 74 so that the user does not lose access to an electrical outlet. As can also be seen, a spacer 37 may also be utilized to ensure that any gaps which would expose any electrical active components. As further seen in FIG. 15A, adapters 27 may be utilized to fill any potential gaps around the plug-in module 70 and body 11 of powered wall plate 10.

Figure 19:
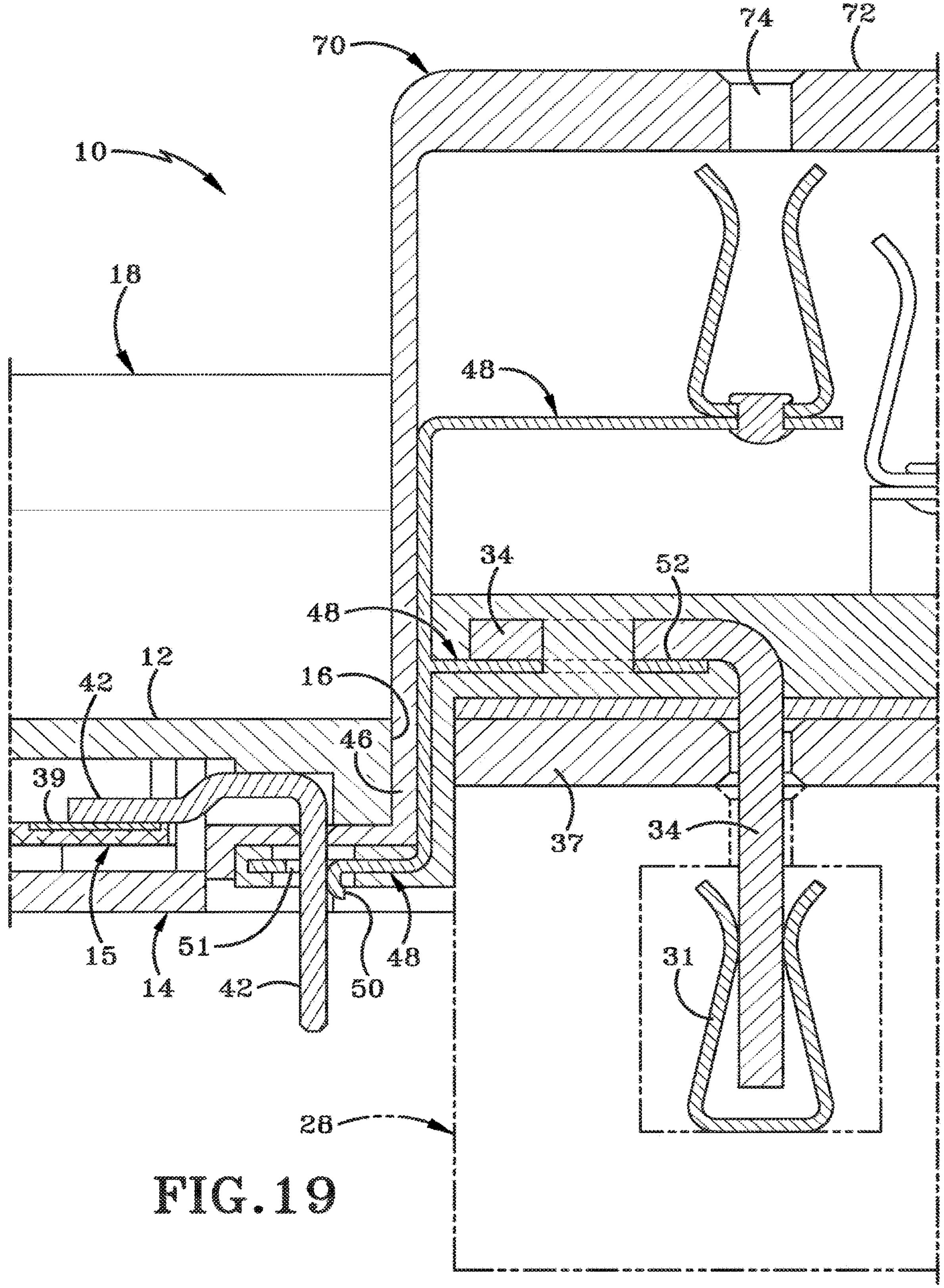
FIG. 19 is a sectional view taken generally about line 19-19 in FIG. 18.
Figure 19A:
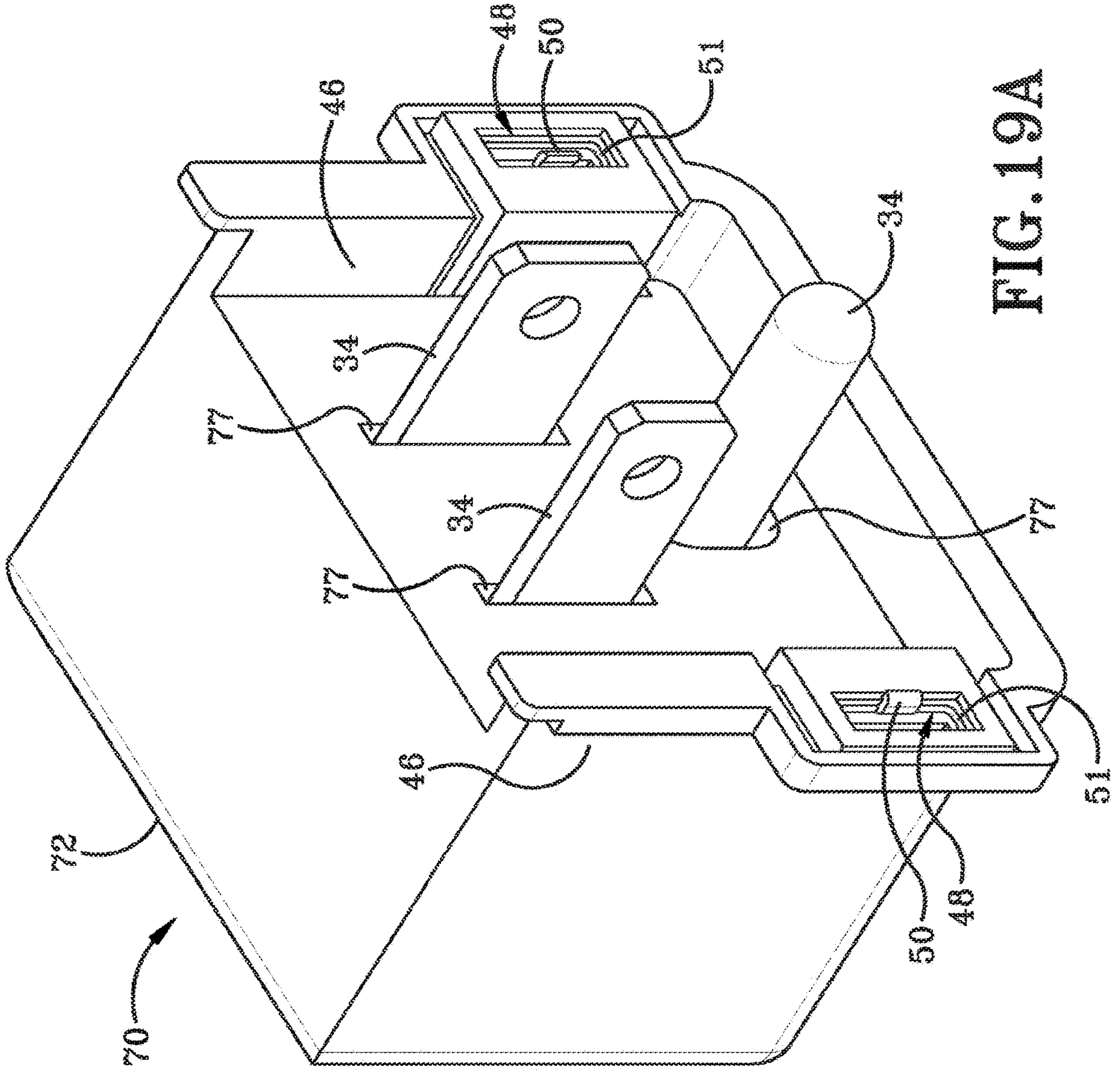
FIG. 19A is a rear perspective view of the plug-in module.

From a functional stand point, the powered wall plate 10 shown in FIGS. 15-19D operates to receive electrical current from the electrical device similar to prior disclosed aspects, such as those shown in FIGS. 7-11A. Similarly, arms 46 each include a current transfer unit 48 having a current transfer contact 50 therein, with each current transfer contact 50 adapted to connect to wall plate current feature 42 to provide electrical current to the powered wall plate 10. Moving to FIG. 19A, plug-in module electrical prongs 34 are shown extending through apertures which are slightly elongated to allow vertical movement of plug-in module electrical prongs 34 to allow slight adjustments in spacing between the powered wall plate 10 and the electrical device in the electrical box.

Figure 19B:
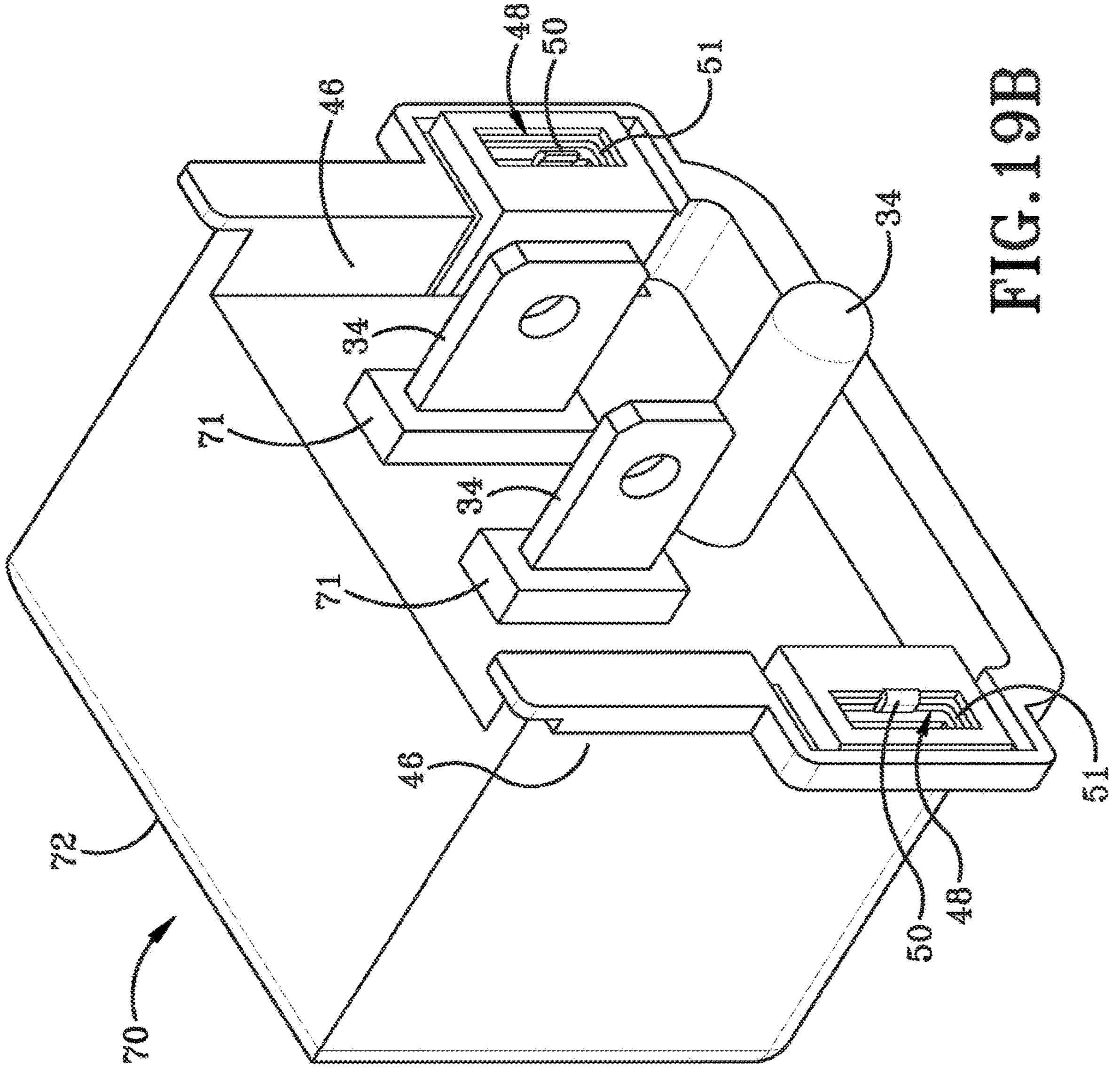
FIG. 19B is a rear perspective view of an alternative plug-in module.

FIG. 19B illustrates a similar plug-in module 70 but illustrates spring biased shutters 71 which function to protect the user from electrocution. Similar to other aspects, spring biased shutters 71 may be compressed by an electrical device face if no protection is needed and may remained extended to protect the plug-in module electrical prong 34 should a small gap otherwise remain.

Figure 19C:
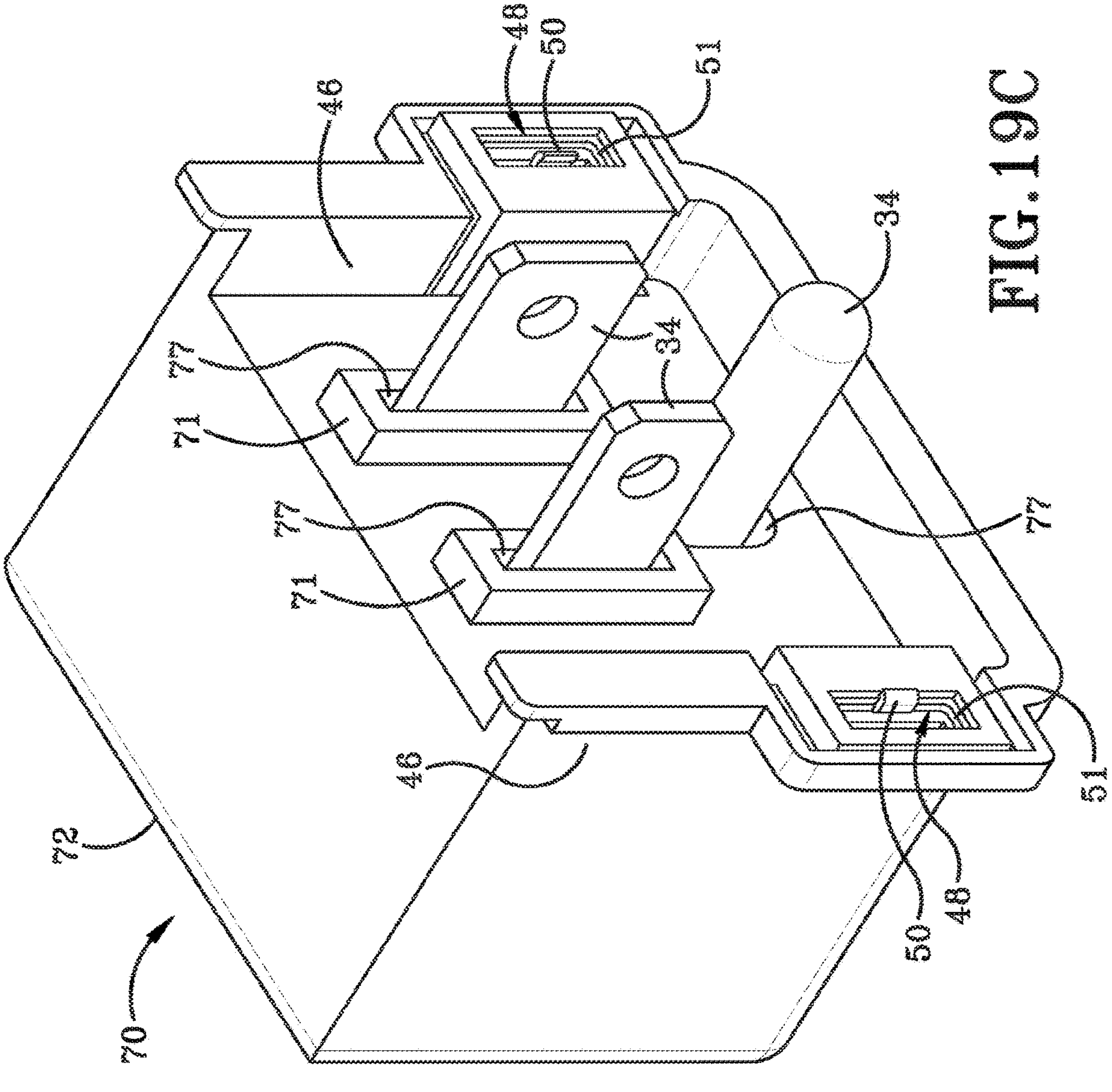
FIG. 19C is a rear perspective view of an alternative plug-in module.

FIG. 19C illustrates a combination of the plug-in module 70 from 19A and 19B.

Namely, plug-in module 70 of 19C includes both spring biased shutters 71 and elongated apertures to allow plug-in module electrical prongs 34 to move and allow appropriate adjustment.

Figure 19D:
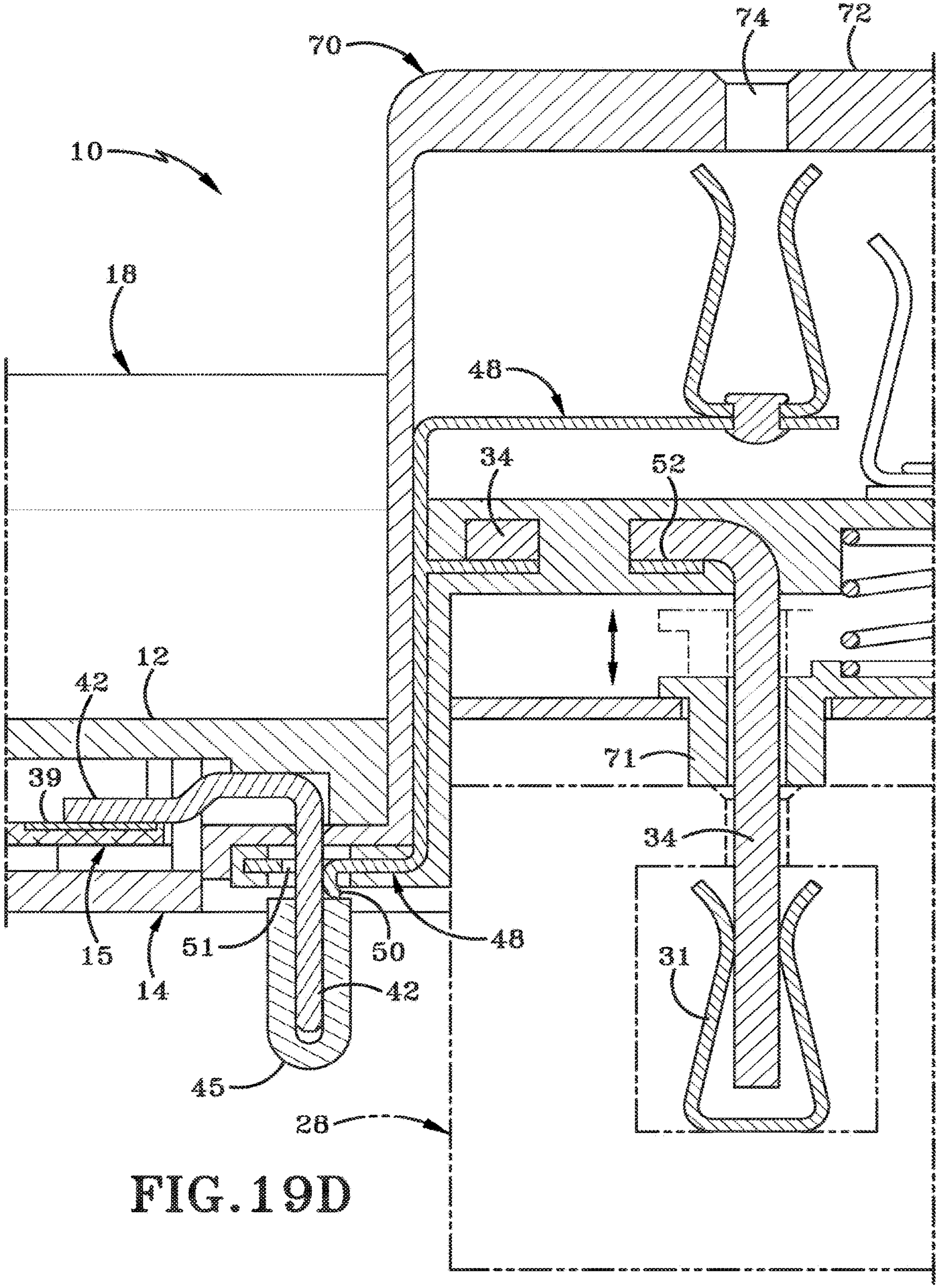
FIG. 19D is a sectional view taken generally about line 19-19 in FIG. 18 and including a cap.

FIG. 19D illustrates plug-in module 70 including a cap 45 similar to previously discussed aspects. Once again, cap 45 functions to prevent and/or restrict potential electrical shock or grounding in case wall plate current feature 42 were to come in contact with another conductive material. Accordingly, it is seen that the various implementations of powered wall plate 10 shown in FIGS. 15-19D may be implemented to power the wall plate while also not reducing the number of available electrical apertures.

Figure 20:
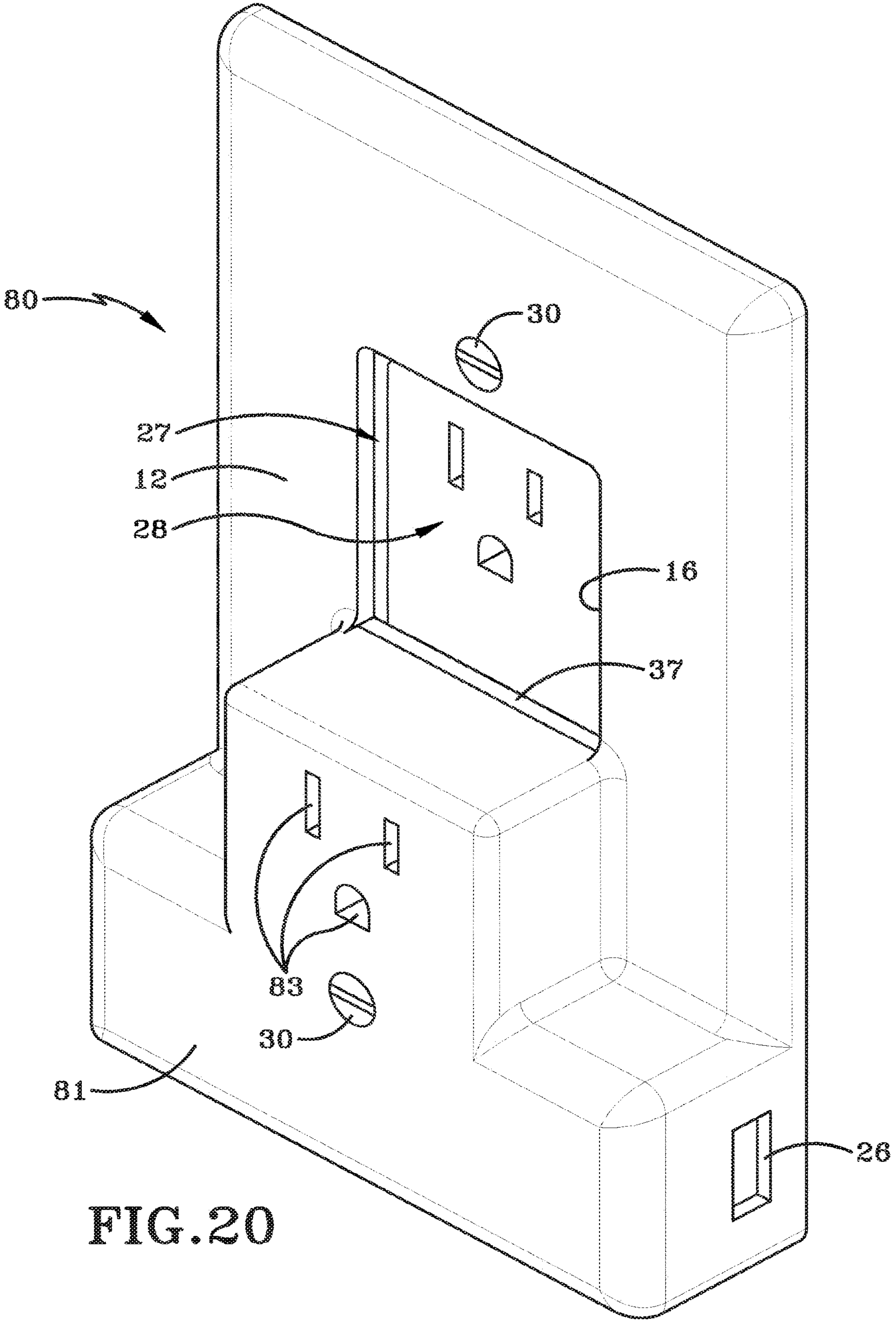
FIG. 20 is a perspective view of a fifth embodiment powered wall plate.
Figure 21:
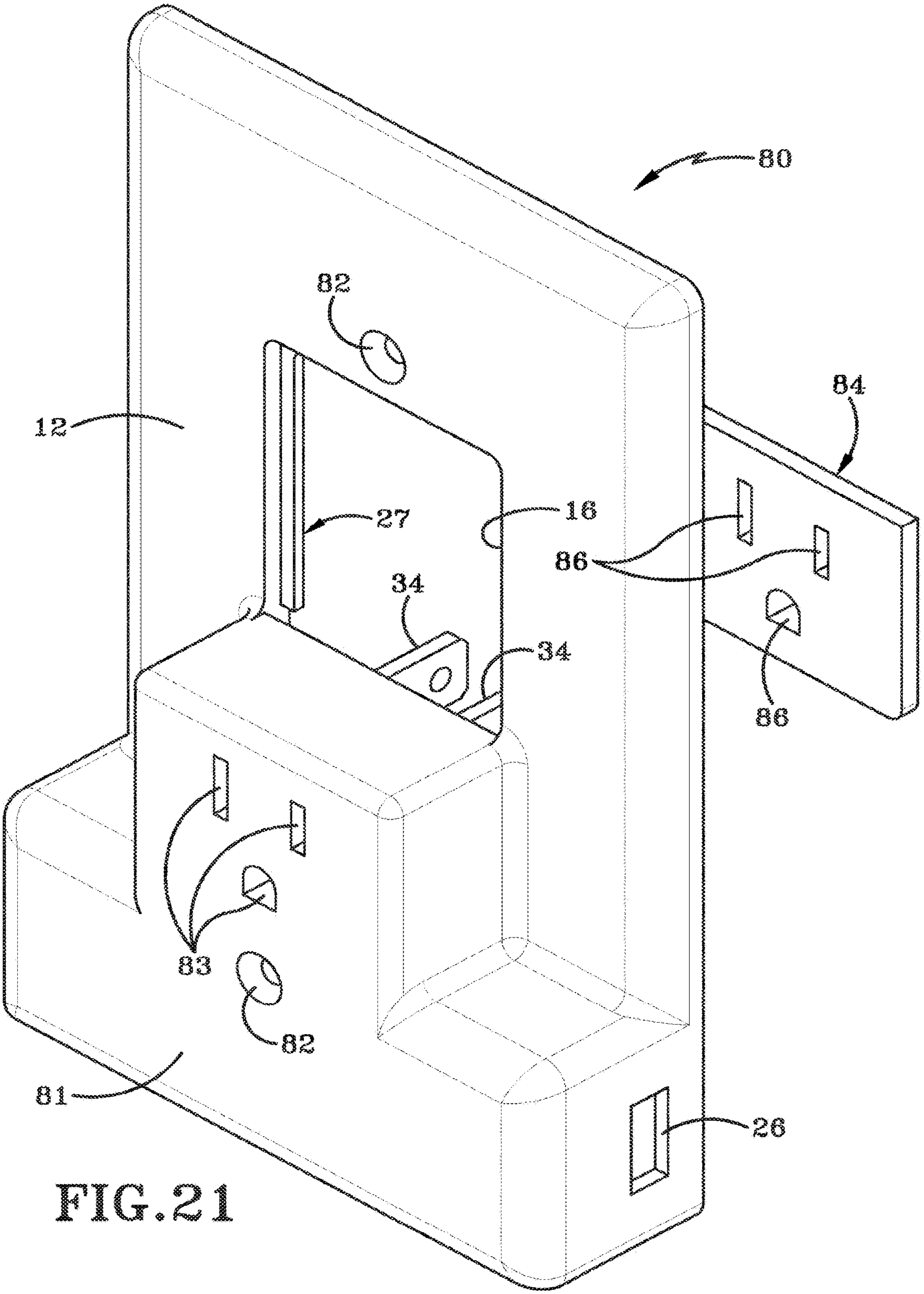
FIG. 21 is an exploded perspective view of the fifth embodiment powered wall plate.
Figure 22:
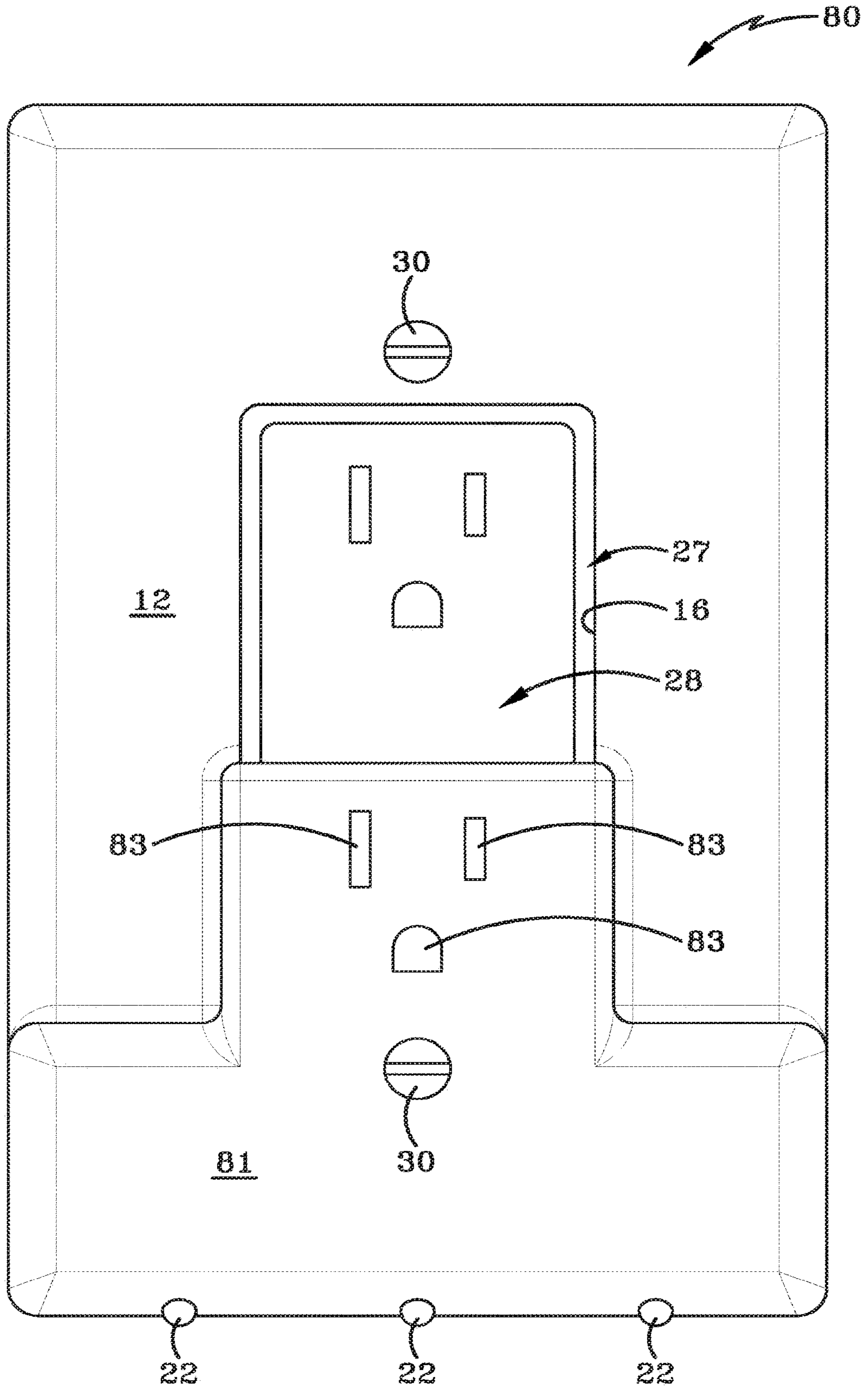
FIG. 22 is a front view of the fifth embodiment powered wall plate.
Figure 23:
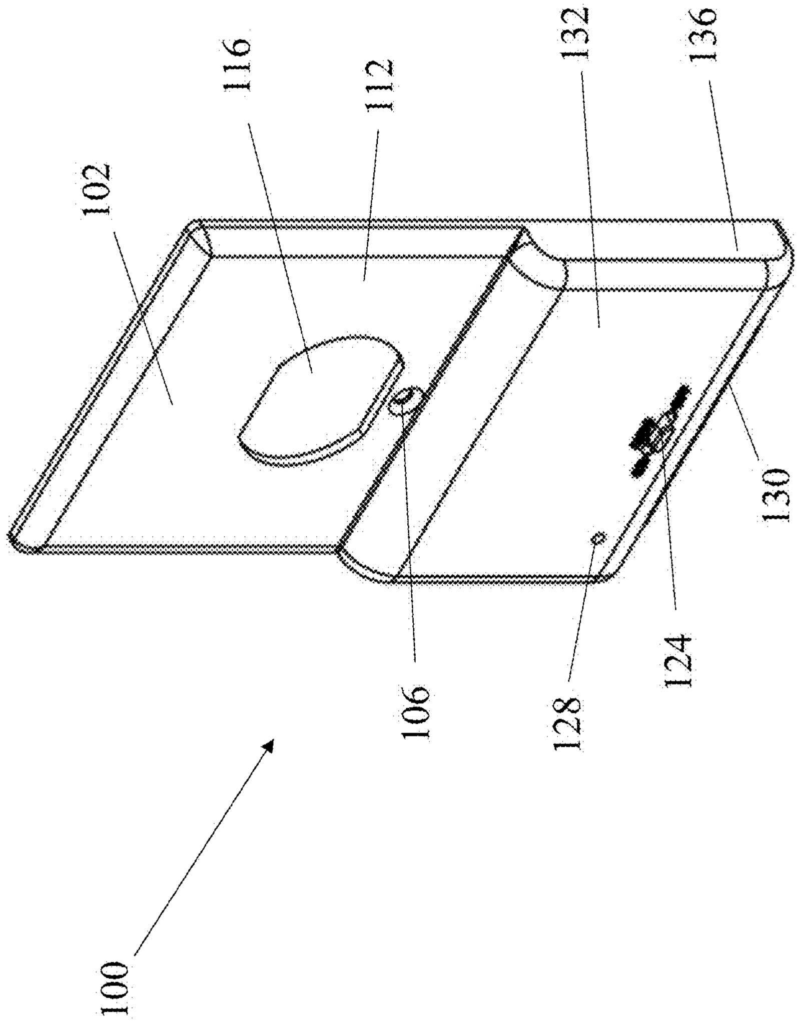
FIG. 23 is a front perspective view of a sixth embodiment of the powered wall plate.
Figure 24:
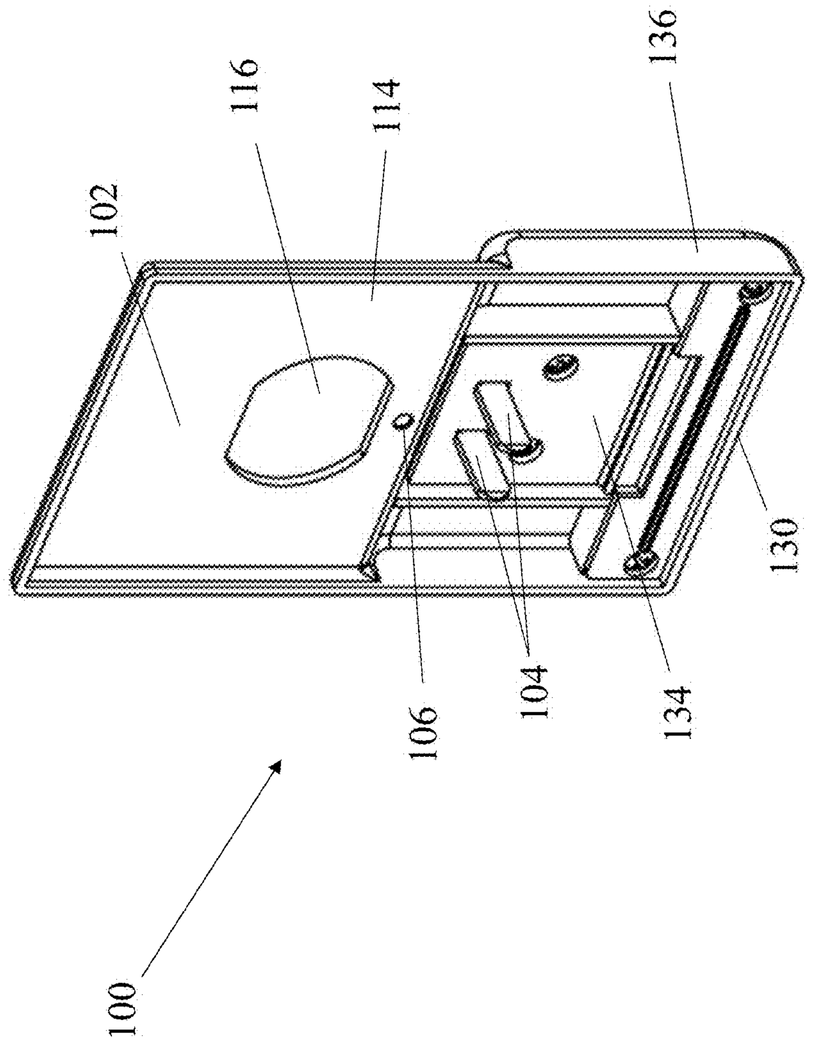
FIG. 24 is a back perspective view of the sixth embodiment of the powered wall plate.
Figure 25:
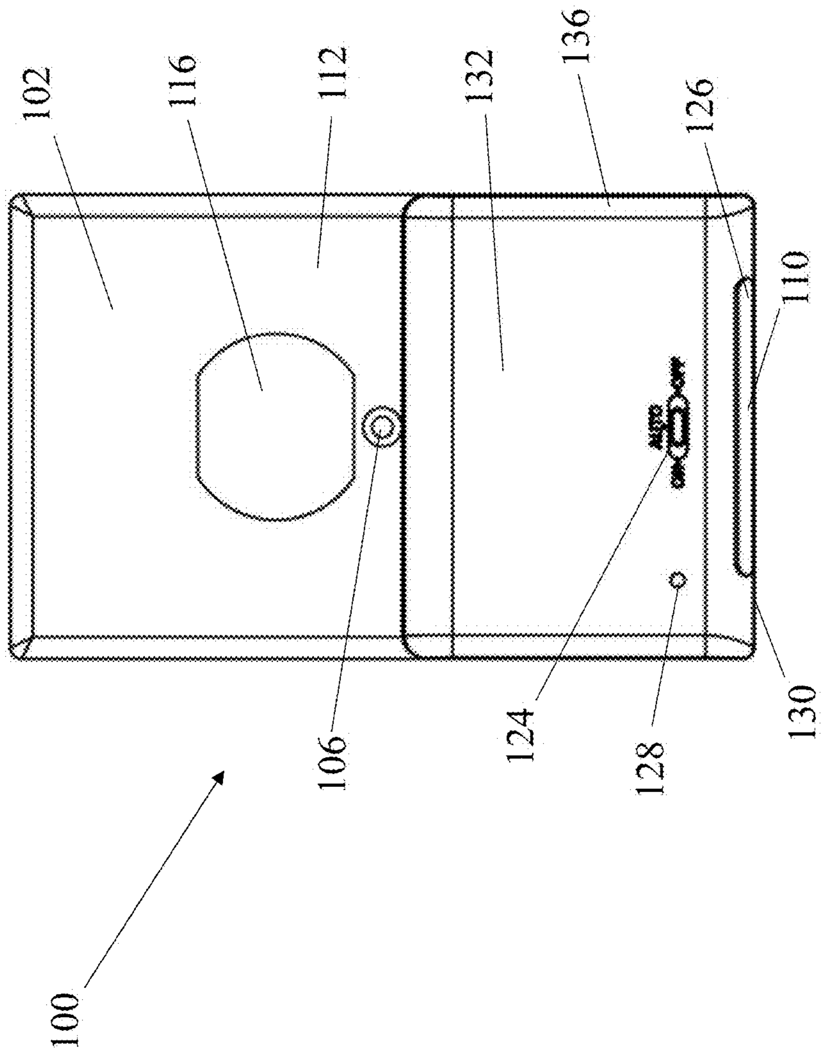
FIG. 25 is a front view of the sixth embodiment of the powered wall plate.

FIGS. 20-22 illustrate a fifth aspect powered wall plate 80 having a unitary construction. Specifically, powered wall plate 80 includes similar mounting screws 30 but also includes mounting apertures 82 and current apertures 83 on a front face 81. Front face 81 may protrude from the wall plate so that electrical contacts may be positioned therein and aligned with current apertures 83. In this manner, the entire wall plate 80 may be installed with prongs 34 within the electrical device 28 and secured using mounting screws 30 while leaving the upper electrical apertures open and providing additional electrical apertures on front face 81. Accordingly, the powered wall plate 80 can be easily installed with minimal effort.

FIGS. 23-27 illustrate a powered wall plate 100 comprising a wall plate 102, at least two electrical plug prongs 104, at least one mounting screw aperture 106, an electrical circuit 108, and an electrical feature 110. The wall plate 102 has a front surface 112 opposite a rear surface 114. At least one opening 116 extends through the front surface 112 and the rear surface 114. The at least one opening 116 is sized to expose a first electrical receptacle 118 of the electrical device 28 therethrough. The at least two electrical plug prongs 104 extend rearward from the rear surface 114 and may originate within the wall plate 102. The at least two electrical plug prongs 104 are configured to removably mate with a second electrical receptacle 120 of the electrical device 28. Thus, when the at least two electrical plug prongs 104 are installed within the second electrical receptacle 120, the first electrical receptacle 118 is exposed through the at least one opening 116, and is accessible to an electrical plug.

The at least one mounting screw aperture 106 extends through the wall plate 102 and is configured to receive at least one mounting screw 122 (see FIG. 27) to attach the wall plate 102 to the electrical device 28. The wall plate 102 covers the gap between the electrical box and the electrical device 28. Thus, by attaching the powered wall plate 100 to the electrical device 28 with at least one mounting screw 122, the gap is more permanently covered, protecting users from accidental contact with the electrical wiring.

The electrical circuit 108 is located between the front surface 112 and the rear surface 114. In some embodiments, the electrical circuit 108 comprises a printed circuit board (see FIG. 27). The electrical circuit 108 is electrically coupled to the at least two electrical plug prongs 104. In particular embodiments, the at least two electrical plug prongs 104 are directly physically coupled to the electrical circuit 108. The electrical feature 110 is exposed on the wall plate 102, is electrically coupled to the electrical circuit 108, and is configured to receive power from the at least two electrical plug prongs 104 through the electrical circuit 108. The electrical feature 110 may be a light, such as an LED light, or a USB port. Alternatively, the electrical feature 110 may be a sensor, such as a temperature sensor, a motion sensor, a photocell configured to measure an ambient light level, or a smoke or carbon monoxide detector. The electrical feature 110 may also be a camera or some other electrical feature 110.

The powered wall plate 100 may additionally comprise a control switch 124 configured to control the supply of power to the electrical feature 110. Thus, when the control switch 124 is in an on position and power is supplied to the at least two electrical plug prongs 104, power is supplied to the electrical feature 110 as well. When the control switch 124 is in an off position and power is supplied to the at least two electrical plug prongs 104, the electrical feature 110 remains without power and is turned off. In addition, in some embodiments, the control switch 124 has an auto position. When the control switch 124 is in the auto position, the control switch 124 selectively provides power to the electrical feature 110. For example, in embodiments where the electrical feature 110 is a light 126, the control switch 124 in the auto position may selectively turn on the light 126 based on an ambient light level. The ambient light level may be measured by a photocell 128. The light 126 may be an LED light, and may be at least one light or a plurality of lights. In embodiments with a light 126, the powered wall plate 100 may also comprise a window 129 through the wall plate 102 which exposes the light 126 through the front surface 112. The light 126 may be located along a bottom edge 130 of the wall plate 102.

Figure 27:
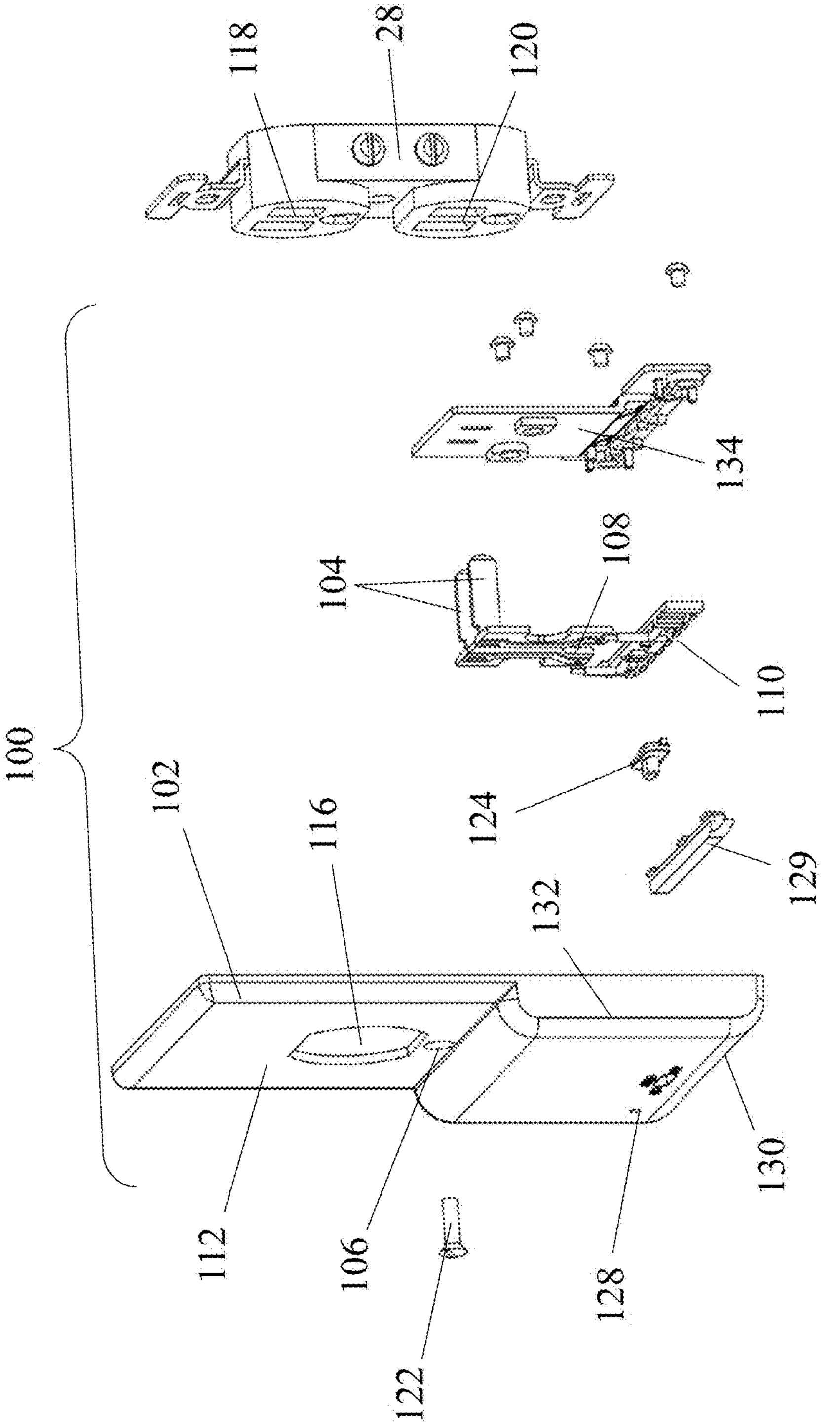
FIG. 27 is an exploded view of the sixth embodiment of the powered wall plate.

The wall plate 102 may have a protruding front face 132 extending forward of the front surface 112. In such embodiments, the photocell 128 may be exposed on the protruding front face 132 and the control switch 124 may be positioned on the protruding front face 132. In addition, the electrical circuit 108 may be located between the protruding front face 132 and the rear surface 114. The rear surface 114 may comprise a circuit back cover 134, which is removably coupled to the wall plate 102. For example, the circuit back cover 134 may be attached to the wall plate 102 with screws. The circuit back cover 134 is configured to cover the electrical circuit 108 when the circuit back cover 134 is installed on the wall plate 102, as shown in FIG. 27. The at least two electrical plug prongs 104 may extend through the circuit back cover 134.

Figure 26:
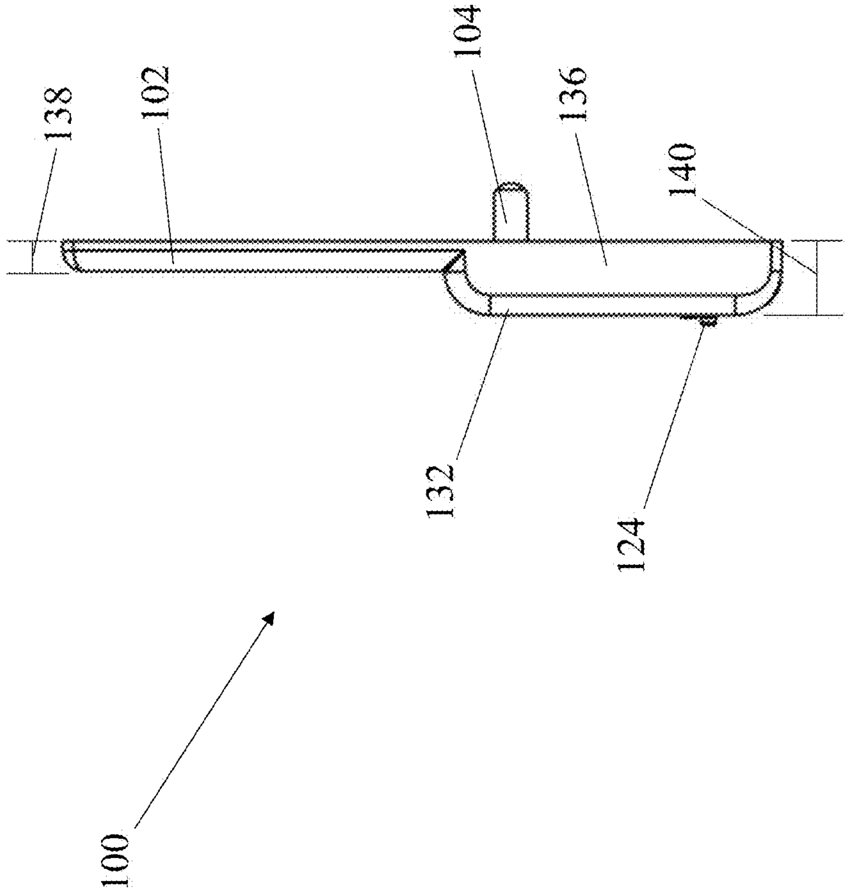
FIG. 26 is a side view of the sixth embodiment of the powered wall plate.

The protruding front face 132 may be located on a bottom half 136 of the wall plate 102. In addition, as shown in FIG. 26, the wall plate 102 may have a profile with a first thickness 138 and a second thickness 140. The first thickness 138 is the thickness of the portion of the wall plate 102 that is nearest to the thickness of a typical wall plate. For example, for the embodiment shown in FIG. 26, the first thickness 138 is the thickness of the top portion of the wall plate 102. On the other hand, the second thickness 140 is the thickness of the thickest portion of the wall plate 102, such as the bottom portion of the wall plate 102 shown in FIG. 26. In such embodiments, the second thickness 140 may be less than three times the first thickness 138. For example, if the first thickness 138 is 0.25 inches, then the second thickness 140 may be less than 0.75 inches.

It will be understood that implementations are not limited to the specific components disclosed herein, as virtually any components consistent with the intended operation of a method and/or system implementation for a powered wall plate may be utilized. Components may comprise any shape, size, style, type, model, version, class, grade, measurement, concentration, material, weight, quantity, and/or the like consistent with the intended operation of a method and/or system implementation for a powered wall plate.

The concepts disclosed herein are not limited to the specific implementations shown herein. For example, it is specifically contemplated that the components included in a particular implementation of a powered wall plate may be formed of any of many different types of materials or combinations that can readily be formed into shaped objects and that are consistent with the intended operation of a powered wall plate. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the powered wall plate may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a powered wall plate, it should be readily apparent that a number of modifications may be made without departing from the spirit thereof and that these implementations may be applied to other powered wall plate. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. A powered wall plate, comprising:

a wall plate having a front surface opposite a rear surface and at least one opening extending through the front surface and the rear surface that is sized large enough to expose a portion of an electrical device therethrough;

at least two electrical wires electrically and physically coupled to the wall plate and extending from a first end of each of the at least two electrical wires at the wall plate rearward away from the rear surface, the at least two electrical wires configured to wrap at a second end of each of the at least two electrical wires around and attach to current mounting screws of the electrical device and provide electricity to the wall plate from the current mounting screws through the at least two electrical wires;

a protruding front face extending forward of the front surface of the wall plate and having an electrical circuit located between the protruding front face and the rear surface;

a side wall extending from the protruding front face toward the rear surface, the side wall comprising a bottom surface and a side surface, wherein the bottom surface and the side surface are nonparallel;

at least one light on the bottom surface of the side wall, wherein the electrical circuit is electrically coupled between the at least two electrical wires and the at least one light;

a sensor electrically coupled to the at least one light and configured to control electricity to the at least one light in response to an environmental characteristic detected by the sensor; and at least one USB port on the side surface of the side wall, wherein the at least one USB port is electrically coupled to the at least two electrical wires.

2. The powered wall plate of claim 1, wherein the electrical device is an electrical outlet having at least two electrical receptacles each exposed through the at least one opening.

3. The powered wall plate of claim 1, wherein the sensor is a motion sensor and the environmental characteristic is motion detected by the sensor.

4. The powered wall plate of claim 1, wherein the sensor is an ambient light sensor and the environmental characteristic is light detected by the sensor.

5. The powered wall plate of claim 1, wherein the rear surface of the wall plate includes two wall plate current sockets each configured to receive a current transfer plug coupled to one of the electrical wires, each of the at least two electrical wires originating within the wall plate through its respective current transfer plug that inserts into one of the two wall plate current sockets at the rear surface of the wall plate.

6. A powered wall plate, comprising:

a wall plate having a front surface opposite a rear surface and at least one opening extending through the front surface and the rear surface that is sized large enough to expose a portion of an electrical device therethrough;

at least two electrical wires electrically and physically coupled to the wall plate and extending from the wall plate rearward away from the rear surface, the at least two electrical connectors configured to wrap around and attach to current mounting screws of the electrical device;

a protruding front face extending forward of the front surface of the wall plate and having an electrical circuit located between the protruding front face and the rear surface;

a side wall extending from the protruding front face toward the rear surface;

at least one light on the side wall, wherein the electrical circuit is electrically coupled between the at least two electrical wires and the at least one light; and a sensor electrically coupled to the at least one light and configured to control electricity to the at least one light in response to an environmental characteristic detected by the sensor.

7. The powered wall plate of claim 6, the side wall comprising a bottom surface and a side surface, wherein the bottom surface and the side surface are nonparallel and wherein the at least one light is on the bottom surface of the side wall.

8. The powered wall plate of claim 6, wherein the electrical device is an electrical outlet having at least two electrical receptacles each exposed through the at least one opening.

9. The powered wall plate of claim 6, wherein the sensor is a motion sensor and the environmental characteristic is motion detected by the sensor.

10. The powered wall plate of claim 6, wherein the sensor is an ambient light sensor and the environmental characteristic is light detected by the sensor.

11. The powered wall plate of claim 6, wherein the rear surface of the wall plate includes two wall plate current sockets each configured to receive a current transfer plug coupled to one of the electrical wires, each of the at least two electrical wires electrically and physically coupled to the wall plate through its respective current transfer plug that inserts into one of the two wall plate current sockets at the rear surface of the wall.

12. A powered wall plate, comprising:

a wall plate having a front surface opposite a rear surface and at least one opening extending through the front surface and the rear surface that is sized large enough to expose a portion of an electrical device therethrough;

at least two electrical wires electrically and physically attached to the wall plate and extending rearward from the rear surface toward the current mounting screws of the electrical device, the at least two electrical wires configured to wrap around and attach to the current mounting screws of the electrical device;

a side wall extending from the front surface toward the rear surface; and at least one light on the side wall, wherein the at least one light is configured to electrically couple to the at least two electrical wires.

13. The powered wall plate of claim 12, further comprising a sensor electrically coupled to the at least one light and configured to control electricity to the at least one light in response to an environmental characteristic detected by the sensor.

14. The powered wall plate of claim 13, wherein the sensor is a motion sensor and the environmental characteristic is motion detected by the sensor.

15. The powered wall plate of claim 13, wherein the sensor is an ambient light sensor and the environmental characteristic is light detected by the sensor.

16. The powered wall plate of claim 12, further comprising a protruding front face extending forward of the front surface of the wall plate and having an electrical circuit located between the protruding front face and the rear surface, wherein the electrical circuit is electrically coupled between the at least two electrical wires and the at least one light.

17. The powered wall plate of claim 12, the side wall comprising a bottom surface and a side surface, wherein the bottom surface and the side surface are nonparallel and wherein the at least one light is on the bottom surface of the side wall.

18. The powered wall plate of claim 17, further comprising at least one USB port on the side surface of the side wall, wherein the at least one USB port is electrically coupled to the at least two electrical wires.

19. The powered wall plate of claim 12, wherein the electrical device is an electrical outlet having at least two electrical receptacles each exposed through the at least one opening.

20. The powered wall plate of claim 12, wherein the rear surface of the wall plate includes two wall plate current sockets each configured to receive a current transfer plug coupled to one of the electrical wires, each of the at least two electrical wires originating within the wall plate through its respective current transfer plug that inserts into one of the two wall plate current sockets at the rear surface of the wall plate.

* * * * *